US005577320A

United States Patent [19]

Shinohara et al.

[11] Patent Number: 5,577,320

[45] Date of Patent: Nov. 26, 1996

[54] CABLE TERMINATION ASSEMBLY AND METHOD

[75] Inventors: Tomoyuki Shinohara, Chiba-ken; Ken Yasuoka, Tokyo; Shigeru Ashida, Chiba-ken; Tsuyoshi Hirahara, Chiba-ken; Koji Ueda, Chiba-ken; Hideki Zako, Chiba-ken, all of Japan

[73] Assignee: Fujikura Ltd., Tokyo, Japan

[21] Appl. No.: 317,749

[22] Filed: Oct. 4, 1994

Related U.S. Application Data

[62] Division of Ser. No. 50,961, Apr. 22, 1993, Pat. No. 5,387, 124.

[30] Foreign Application Priority Data

Apr. 24, 1992 [JP] Japan .................................. 4-106969
Jun. 1, 1992 [JP] Japan .................................. 4-140739

[51] Int. Cl.$^6$ ............................ H01R 43/02; B23P 19/00

[52] U.S. Cl. ................................ 29/860; 29/748; 29/749

[58] Field of Search ............................ 29/748, 749, 860, 29/857

[56] References Cited

U.S. PATENT DOCUMENTS

| | | | |
|---|---|---|---|
| 3,605,060 | 9/1971 | Praeger et al. . | |
| 3,765,073 | 10/1973 | Burns . | |
| 3,866,292 | 2/1975 | Tucci | 29/749 X |
| 4,017,954 | 4/1977 | Grubb | 29/749 |
| 4,602,831 | 7/1986 | Lockard | 29/860 X |
| 4,649,636 | 3/1987 | Arbogast, Jr. et al. . | |
| 4,682,840 | 7/1987 | Lockard | 29/860 X |
| 4,892,489 | 1/1990 | Hirai . | |
| 5,192,833 | 3/1993 | Gibson | 29/857 X |

FOREIGN PATENT DOCUMENTS

| | | |
|---|---|---|
| 0094173 | 11/1983 | European Pat. Off. . |
| 0213859 | 3/1987 | European Pat. Off. . |
| 1448022 | 6/1966 | France . |

*Primary Examiner*—Carl J. Arbes
*Attorney, Agent, or Firm*—Oblon, Spivak, McClelland, Maier & Neustadt, P.C.

[57] ABSTRACT

The purpose of the present invention is to improve the performance properties of the cable terminal end assembly and to make its configuration compact. A cable having signal wires and a ground wire are arranged laterally in a casing which is provided with a coupling section for coupling to the electrical device. The signal wires and the ground wires are separated by an insulation plate, and extend out from the ends of the cable into the casing. Signal wires and ground wires are bonded, to specific respective contact strips disposed inside the coupling section. The electrical connections inside the casing are molded with molding. The advantage of the assembly configuration is that the cables are arranged laterally to house many cables compactly in the casing, and the insulation plate eliminates any possibility of shorting between the signal and ground wires, and signal distribution to the device is made possible, without the necessity for such costly parts as a printed circuit board, by customized selection of the contact strips to be joined to the signal wires and to the ground wires in accordance with the requirements of the device.

9 Claims, 21 Drawing Sheets

CABLE TERMINATION ASSEMBLY AND METHOD

This is a Division of application Ser. No. 08/050,961 filed on Apr. 22, 1993 now U.S. Pat. No. 5,387,124.

BACKGROUND OF THE INVENTION

1. Field of the Invention

The present invention relates to a cable ends termination assembly, the method of assembling the termination assembly and the apparatus for assembling the structure of the cable ends to produce the termination assembly.

2. Technical Background of the Invention

Generally, electrical signal transmission is carried out through wires termed signal wires which carry signal data and ground wires which connect to the ground. However, it should be noted that in this invention the structural configuration of both wires is the same, and therefore the wires are interchangeable to carry either the signal current or the grounding current.

Conventionally, when it is necessary to provide a plurality of signal wires (first wire) for electrical devices, three types of wire configuration were used: round cables having many signal wires; a plurality of twisted pair signal wires and an adjacent ground wire (second wire); and a flat cable configuration having a plurality of signal wires laid side by side encased in a sheath.

In the round cable configuration, a plurality of insulated signal wires and an adjacent ground wire are bundled together with an insulated outer sheath.

In the pair cable configuration, a plurality of insulated signal wires and adjacent exposed ground wires are bundled with an insulating outer sheath, and the terminal ends of the signal wires and the ground wire extending out of the insulated section are arranged flat and are connected to the contacting elements of an electrical device. In such pair cables, the signal and ground wires are positioned by inserting one wire each in the wire guiding grooves formed on the top surface of a plate receptor of the plug-in casing. The terminal ends of the wires are attached to the contacting elements (for contacting the device) by such means as soldering and spot welding, and the assembly are integrally molded by injection molding. This is followed by disposing a printed circuit board between the contacting elements and the pair cable, in which the printed circuit board serves as wiring means to transmit the signals through the pair cable.

The round cable configuration mentioned above has the tendency to be bulky because of the number of insulated signal wires which are bundled together. Therefore, the joining section joining the round cable to the contacting elements tended to be bulky, and it was difficult to join the round cable to modern miniaturized electrical devices.

For the pair cable on the other hand, because of the process of injection molding, the terminal ends of the signal and ground wires are pressed by the resin at elevated temperatures, and there was the danger of debonding of the wires from the contacting elements causing severing of the electrical connections. Further, because the signal wires and the ground wires are arranged within a common plane, there was a danger of the signal wires coming into contact with the ground wires. Further, when a printed circuit board is utilized for the purpose of distributing the signals, the board must be custom fabricated for each application, leading to high expenses and manufacturing effort. Further, there is a danger of increasing contact resistance because of the duplicate bonding connections involved, the contacting elements bonded to the printed circuit board which is bonded to the ends of the pair cable.

In using the flat configuration, because the signal wires are laid out in a flat configuration, it was difficult to route the signal wires to specific locations required. Further, in distributing the signal wires to several locations, the wires are stripped from the insulation and routed to the specified location, thus leading to complex tangling of the signal wires.

Furthermore, when the distance between the flat cable ends and the wiring locations in a connector are different, different lengths are required for each of the signal wires. There are many cases of wastage in the past, caused by insufficient lengths of the signal wires. Such signal wires are not only wasted, but the wire ends must be treated in some way, resulting in uneconomic manufacturing process.

SUMMARY OF THE INVENTION

The present invention presents a cable terminal end assembly, for solving the problems of the existing terminal end assemblies, having improved electrical properties and a compact configuration, as well as a method of production for and an apparatus for making such a terminal end assembly.

A cable termination assembly is presented for electrically connecting a plurality of cables to an electrical device through a coupling section disposed at the forward end of said assembly, wherein each cable includes at least one first wire and a second wire, said assembly comprising:

(a) a casing in which terminal ends of said plurality of cables are disposed laterally;

(b) a plurality of first wires extending forwardly from said terminal ends of said plurality of cables and a plurality of second wires extending forwardly from said terminal ends of said plurality of cables;

(c) an insulation plate disposed between said plurality of first wires and said plurality of second wires; and wherein said first wires and said second wires are electrically connected to said coupling section and the space surrounding the connection section of said first wires, second wires with said coupling section is filled with a molding.

According to this configuration of the terminal assembly, it becomes possible to miniaturize the assembly because many cables are arranged laterally inside the casing. The arrangement of connecting the first wire and second wires to the coupling section, and the presence of the insulation plate eliminate any possibility of contact between the first wires and the second wires.

Because many cables are laterally arranged in the casing, it becomes possible to handle many signal wires and ground wires in a compact arrangement, permitting an assembly which is suitable for connecting to a complex device requiring a large number of connections. The provision of the coupling section permit coupling of the wires to the complex device. This method of coupling to the device eliminates the need for a printed circuit in the assembly, leading to low cost of making the assembly. The duplicate bonding connection due to the presence of the circuit board is eliminated, the internal resistance of the assembly is reduced, thus improving the electrical performance of the assembly.

The presence of the insulation plate between the first and second wires permits the first and second wires to be disposed at different elevation levels, and permits separation. Therefore, even after the molding operation at elevated temperature and pressures, the possibility of contact between the first and second wires is eliminated, thus assuring the performance and reliability of the assembly. The molding also serves to protect the assembly from mechanical shock, moisture and the direct application of pulling forces to the first and second wires, thereby improving the performance and reliability of the assembly.

The assembling apparatus of the present invention comprises: cable frame which arranges many cables in a lateral arrangement; cabling clamp means for holding the cables and the laterally arranged cables as a unit; wire blocks which receives the first and second wires; a coupling section which connects to the electrical device; and bonding device which bonds the wires to the respective contact tail section of the coupling section and to the ground plate.

According to the cable terminal end assembling apparatus, a plurality of cables are clamped between a cable frame and a clamping device. The wires extending from the cable are inserted in the respective wire guiding blocks, and are bonded for electrical connection in the coupling section and the ground plate (to be connected to in the coupling section) with bonding means. The coupling section connects the wires to the electrical device.

According to the cable terminal end assembly, it is possible to miniaturize the cable end assembly because a plurality of wires are arranged laterally side by side. The apparatus arranges a plurality of wires in the wire guiding blocks and enables to automate the bonding operation of a plurality of wires to the ground plate and to the coupling section. Therefore, the apparatus enables to make efficient distribution wiring, shortens the time required for the wiring. The plurality of wires are bonded at the same time, without the need for manual bonding to printed circuit board, thus performing the operation cost effectively.

The present invention present a method of assembling terminal ends of a plurality of cables having at least one first wire and a second wire using the above-described apparatus, the method comprising the steps of:

(a) disposing a plurality of cables laterally on a cable guiding frame;

(b) separating said at least one first wire from said second wire;

(c) inserting a plurality of said second wires individually into said wire guiding block;

(d) clamping said plurality of cables between said cable guiding frame and said cable clamp means;

(e) bonding a plurality of said second wires to said ground section with said bonding means;

(f) disposing an insulation plate between said plurality of said first wires and said second wires;

(g) bonding said first wire and said ground section in said coupling section with said bonding means.

According to the method of assembling the terminal ends of the cables presented above, the method utilizes the assembling apparatus presented above, a plurality of cables are arranged laterally and the wires are separated into first wires and second wires, and the second wires are inserted into the wire guiding block individually, and are clamped between the cable frame and the clamping device. The second wires are bonded to the ground plate, and an insulation plate is placed between the first and second wires, then the first wires and the ground plate are bonded in the coupling section.

According to the method of assembling the cable terminal ends presented above, the wires of the plurality of cables arranged laterally are divided into first and second wires. The second wires are inserted into the wire guiding block individually, and are clamped by the clamping device. Therefore, the lateral arrangement and the separation of the first wires from the second wires are maintained. The second wires are bonded to the ground section, thereby improving the bonding operation of the second wires. The insulation plate is disposed between the first wires and the second wires and the first wires are bonded to the coupling section, and the ground plate are bonded to the coupling section. The method of assembling eliminates any contact between the first and second wires even during the elevated temperature and pressure in the molding process to surround the connections with a molding, thereby assuring a low internal resistance of the cable terminal end assembly. Because of the presence of the insulation plate, the molding material can be guided effectively to the regions needed, thereby assuring a safe, reliable and compact assembly to be produced.

PREFERRED EMBODIMENT OF THE INVENTION

Figure 1:
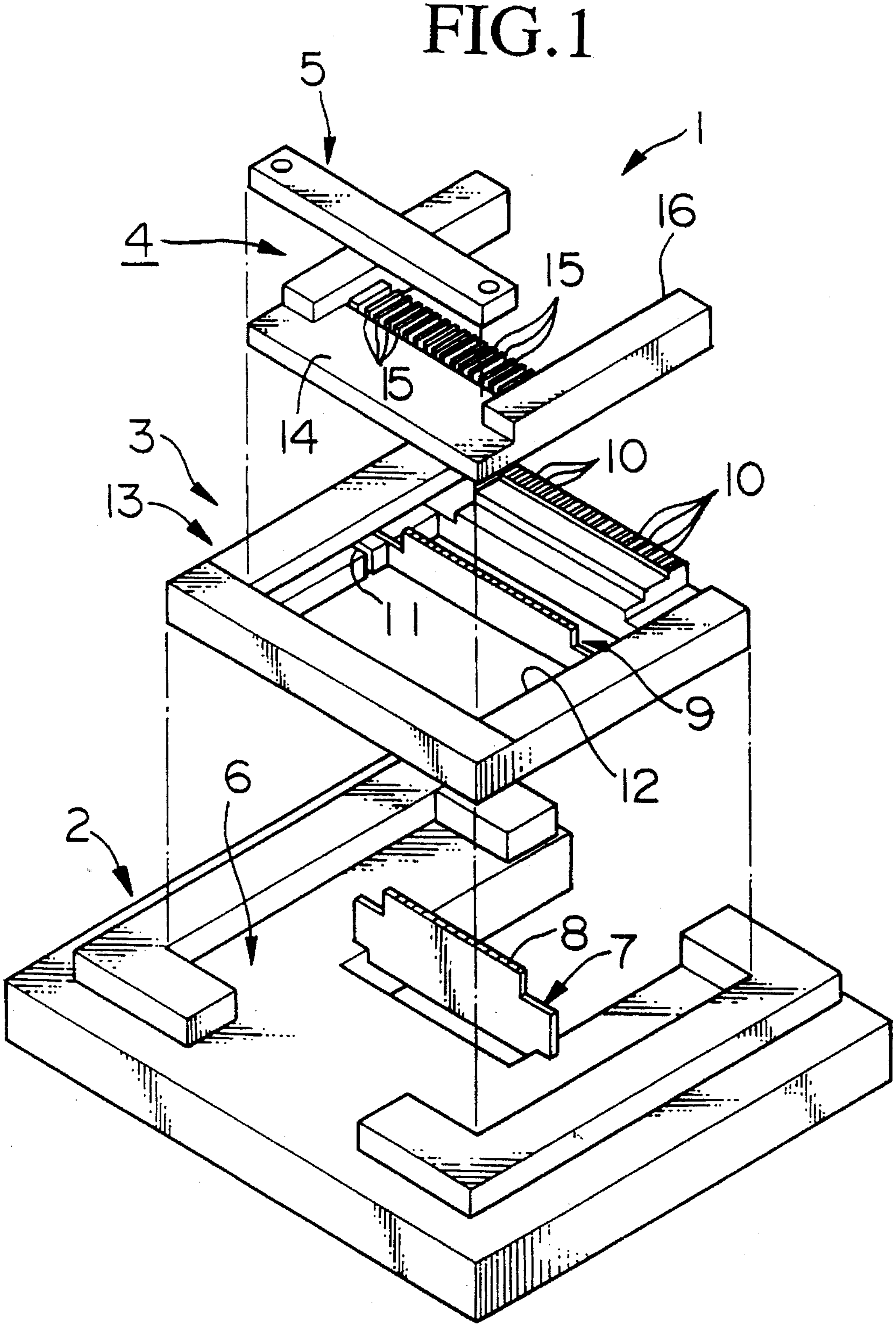
FIG. 1 is an exploded perspective view of a cable terminal end assembling apparatus of an embodiment of the present invention.

An embodiment of the present invention will be explained below with reference to the figures.

The embodiment of the cable terminal end assembly will be explained with primary reference to FIG. 2 and FIGS. 15–17. The drawings show that the forward end of the completed terminal end assembly shown in FIG. 15 connects to an electrical device and a plurality of cables are disposed at the rearward end of the assembly.

The reference numeral 21 refers to the cable terminal end assembly. The terminal end assembly 21 consist primarily of a plurality of cables 22 and a casing 23 which houses the end sections of the cables 22 in a flat lateral arrangement. The casing 23 can be made of such materials as plastic resins or metallic materials which are effective for shielding against electromagnetic interference.

Disposed at the forward end section of the casing 23 is a coupling section 24 which connects the cable 22 to an electrical device. The cable 22 consists of two twisted signal wires (first wire) 25 having an insulation *25a*, a ground wire (second wire) 26 having an insulation *26a* for providing grounding for the electrical device, and an insulation sheath 27 housing the insulated signal wires 25 and the insulated ground wires 26.

The end section of the sheath 27 of the cable 22 is clamped by the casing 23, and the signal wires 25 and the ground wires 26 extend into the casing 23 beyond the end section of the sheath 27. Inside the casing 23, an insulation plate 28 is disposed between the signal wires 25 and the ground wires 26, and electrical connections are made to the signal wires 25 in the coupling section 24 by such methods as soldering and spot welding.

Figure 2:
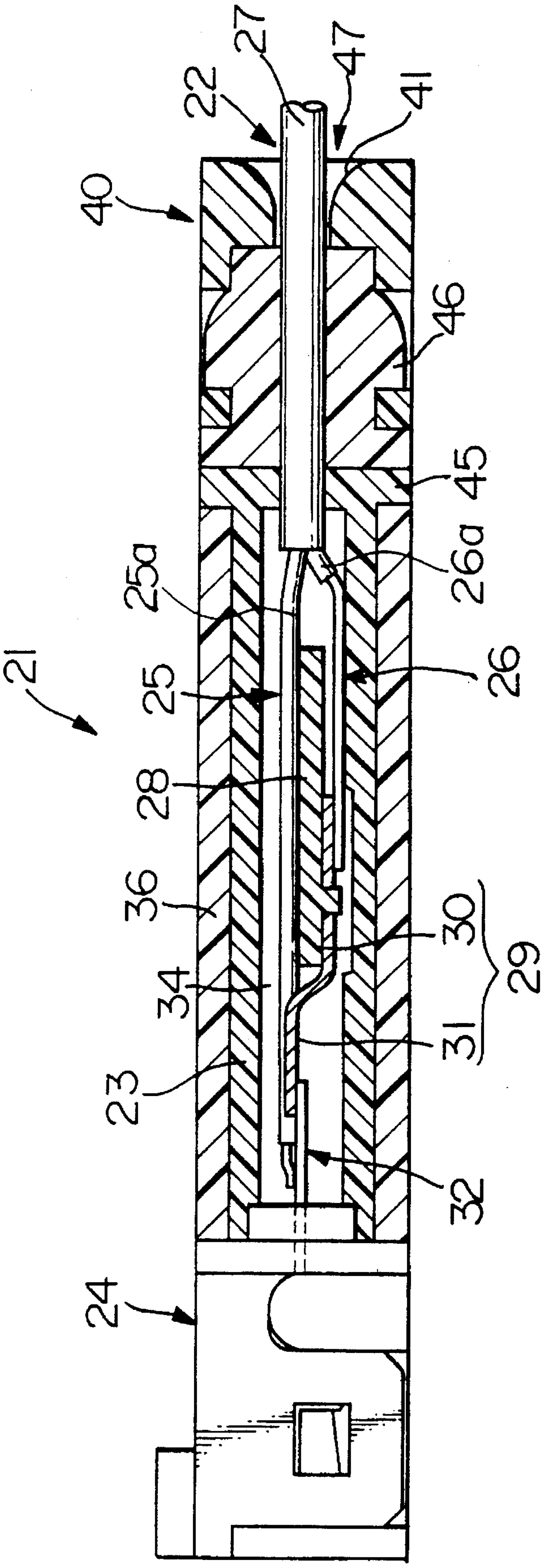
FIG. 2 is a cross sectional view of the cable terminal end assembly of the embodiment of the present invention.
Figure 16:
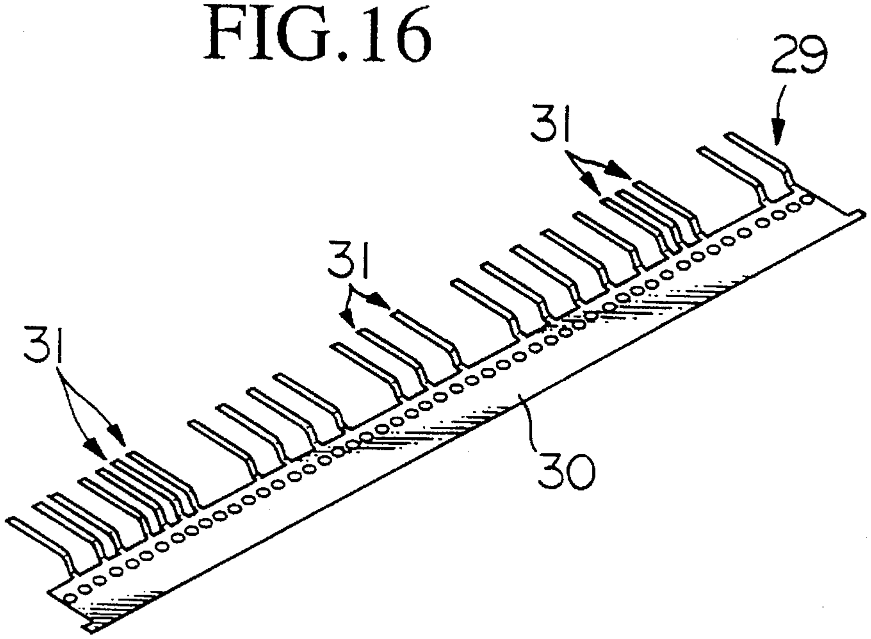
FIG. 16 is a perspective view of a ground plate used in terminal assembly of the embodiment.
Figure 17:
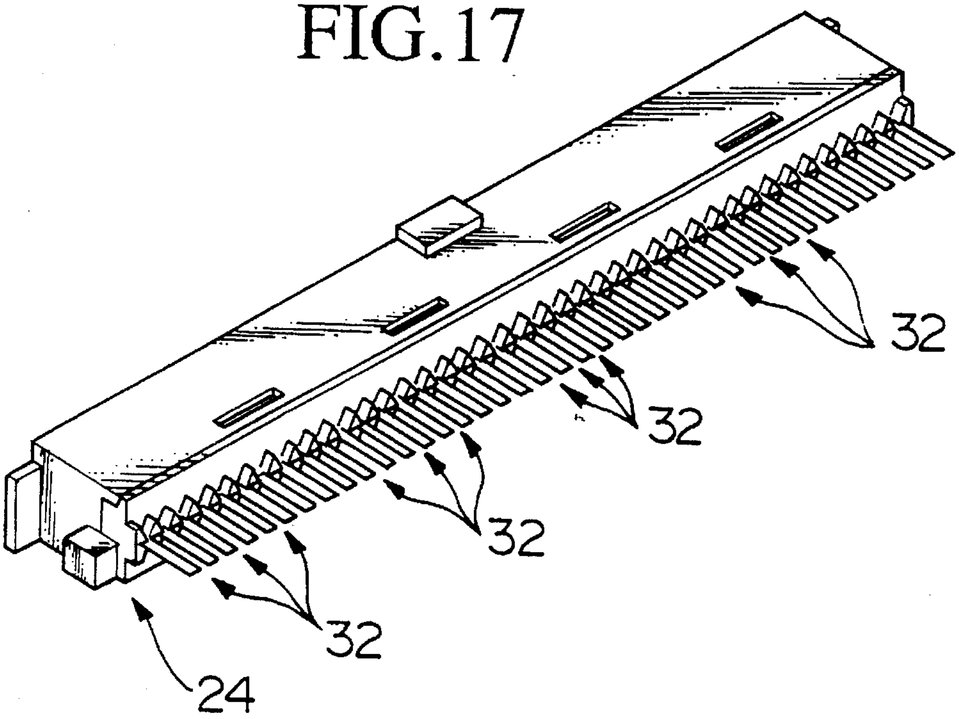
FIG. 17 is a perspective view of the contact strips and the coupling section of the embodiment.

The ground wire 26 is connected to a ground section 29 adjoining the insulation plate 28 by such methods as mentioned above. As shown in FIG. 2, the ground section 29 has the insulation plate 28 placed thereon, and comprises, as shown in FIG. 16, a common ground part 30 to which the ground wire 26 is connected and a stepped comb part 31 which is connected to the contact strips 32 (contact strip means) in the coupling section 24. The comb part 31 is coplanar with the ends of the signal wires 25. The comb part 31 and the signal wires 25 are connected to a plurality of contact strips 32, shown in FIG. 17, which are disposed serially with the coupling section 24, as shown in FIG. 2.

Inside the casing 23 is a molding 34, which is made of a low melting point resin material, and serves to cover the signal wires 25, ground wires 26, ground section 29 and the contact strips 32 for connecting to specific signal wires 25 and to specific comb part 31 of the ground section 29. The exterior surfaces of the casing 23 is covered with an overmolding 36 which is produced by an elevated temperature injection molding process. In some cases, the overmolding 36 is made of an electrically conductive resin for electromagnetic shielding purposes.

A series of projection portions 45 are provided on the outer peripheral surfaces of the casing 23 to prevent the casing 23 from being fluttered or flexed by the injection pressure during the forming of the overmolding 36.

Figure 3:
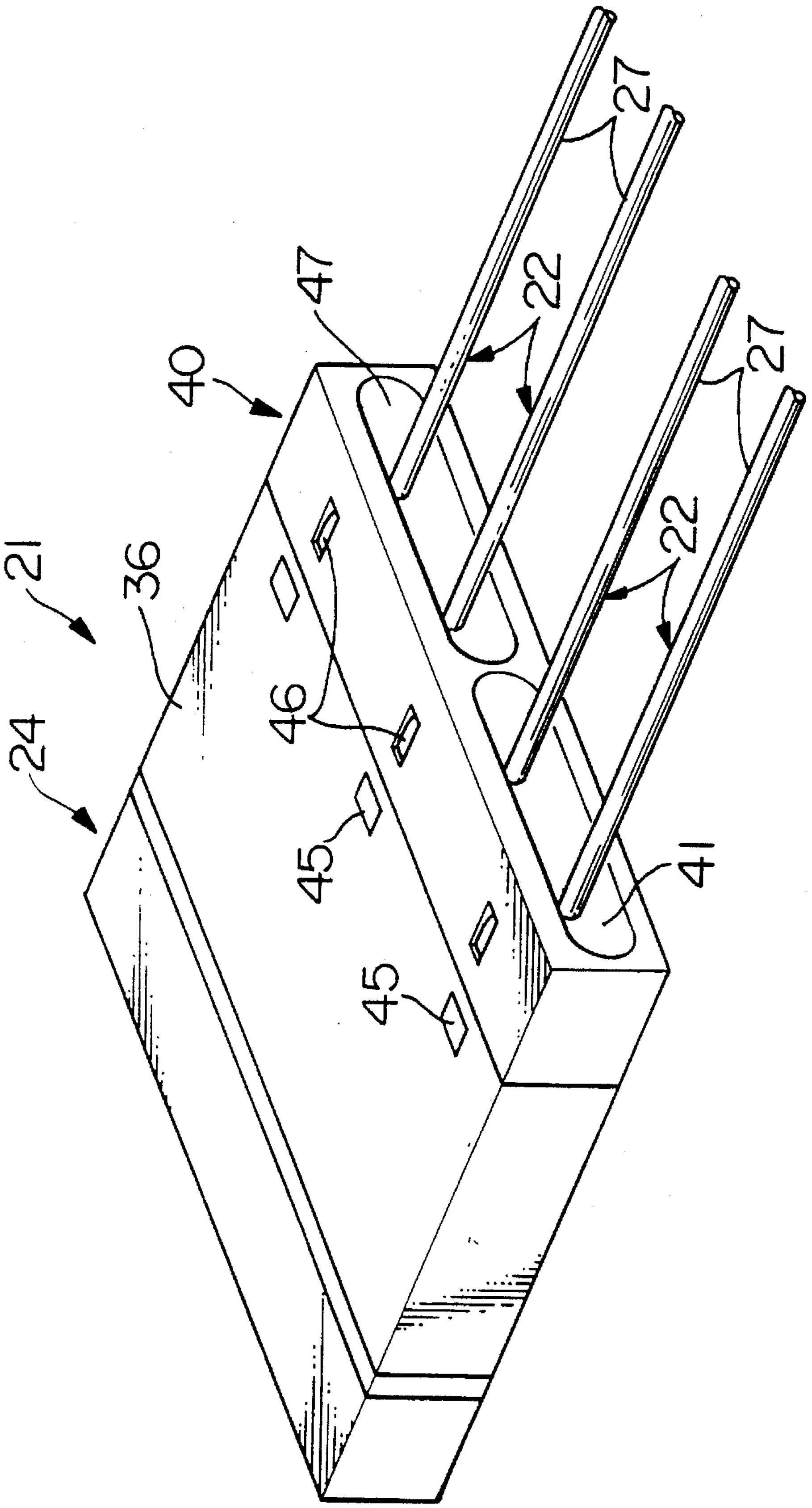
FIG. 3 is a perspective view of the cable terminal end assembly shown in FIG. 2.

To the rearward section of the overmolding 36 is attached an end block 40 (refer to FIG. 3) in which are disposed engaging parts 46 (refer to FIG. 2). The end block 40 is provided with cable insertion sections 47 for receiving the cables 22 extending from the overmolding 36. The insertion section 47 is provided with curved parts 41 of a specific radius for clamping the cables 22 in place.

According to such a terminal end assembly 21, a plurality of ends of the cable 22 are arranged laterally in the casing 23, thus providing a compact design for retaining a plurality of cables 22 which can provide many branching circuits. The cables 22 are electrically connected to the contact strips 32 in the coupling section 24 to provide signal to the electrical device attached to the coupling section 24 of the casing 23.

Another aspect of the assembly 21 is that because the insulation plate 28 is provided between the signal wires 25 and the ground wires 26, the signal wires 25 and the ground wires 26 are disposed on at different elevation levels. Therefore, during an injection process to form the molding 34, even if the molding material under high pressure and temperature pressed down on the signal wires 25 and the ground wires 26, the wires 25, 26 would be pressed against the insulation plate 28, thus preventing the direct contact between the signal wire 25 and the ground wire 26.

Another aspect of the assembly 21 provides for the signal wires 25 to contact in the coupling section 24 directly, and the ground wires 26 to contact the coupling section 24 via the ground section 29, therefore the design allows simultaneous contact of the electrical device with both the signal wires 25 and the ground wires 26 through the coupling section 24.

Another aspect of the assembly 21 is that the end block 40 attached to the casing 23 is provided with a number of curved parts 41, therefore, even if the cables 22 extending out of the casing 23 are bent, the cables 22 are bent at a specific radius of the curved parts 41.

According to the terminal end assembly 21 of the design presented above, a plurality of the ends of the cables 22 are housed laterally in the casing 23, thus enabling to compactly house many cables 22 as well as to provide many branching circuits. The design enables to provide a plurality of electrical connections to a complex electrical device requiring many electrical connections. By providing a coupling section 24 to the casing 23, the design enables complete electrical connections to be made by the sole connection of the coupling section 24 to the electrical device. Further, since electrical contacts are made without the use of the printed circuit board, the design allows not only saving in the cost of preparing printed circuit boards, but also eliminates two electrical contact regions, thereby reducing the internal contact resistance of the cable 22, thus improving the electrical performance of the cable terminal end assembly 21.

Further, because of the provision of the insulation plate 28 between the signal wires 25 and the ground wires 26, the signal wires 25 and the ground wires 26 are disposed at different elevation levels. Therefore, even if the molding material under high injection pressure and temperature forced together the signal wires 25 and the ground wires 26, the contact between the wires 25, 26 is prevented by the insulation plate 28, thereby improving the reliability of manufacturing the molding 34. The overall effect of the molding 34 is that the signal wires 25 and the ground wires 26 are protected from the external shock, moisture and the direct application of tension forces to the wires 25, 26, thus improving the reliability and safety of the cable terminal end housing structure.

Further advantage of the configuration is that the ground wire 26 is connected to the coupling section 24 via the ground section 29, and the signal wires 25 are connected directly to the contact strips 32 in the coupling section 24, so that the wires 25, 26 are able, to be connected to the electrical device by connecting only the coupling section 24 to the electrical device, thus eliminating the necessity for wiring the ground wire 26 separately. The wiring efficiency of the ground wire 26 is improved, thereby improving the wiring operation of a plurality of cables 22. Connecting of the comb part 31 of the ground section 29 to the contact strips 32 in the coupling section 24 enabled the ground section 29 to be connected to the specific strips 32 in the coupling section 24, thus facilitating the connecting operation for the ground section 29.

Further, because curved parts 41 having a specific radius of curvature are provided in the end block 40 attached to the casing 23 in the direction of the extending cable 22, the cable 22 contacts the curved part 41 at a specific bending angle. This design prevents the cable 22 from being bent sharply in the extending direction, thus preventing the stress concentration at the bend in the cable 22, thus improving the reliability of the cable 22.

Next, the apparatus and the method for assembling the wires to produce the terminal end assembly 21 as described above will be explained. In FIG. 1, the cable terminal end assembling apparatus 1 comprises a work base 2; a wire guiding jig 3 coupled to the work base 2; a cable guiding frame 4 coupled to the wire guiding jig 3; and a cable clamp 5 for clamping a plurality of cables 22 placed on the cable guiding frame 4.

Figure 4:
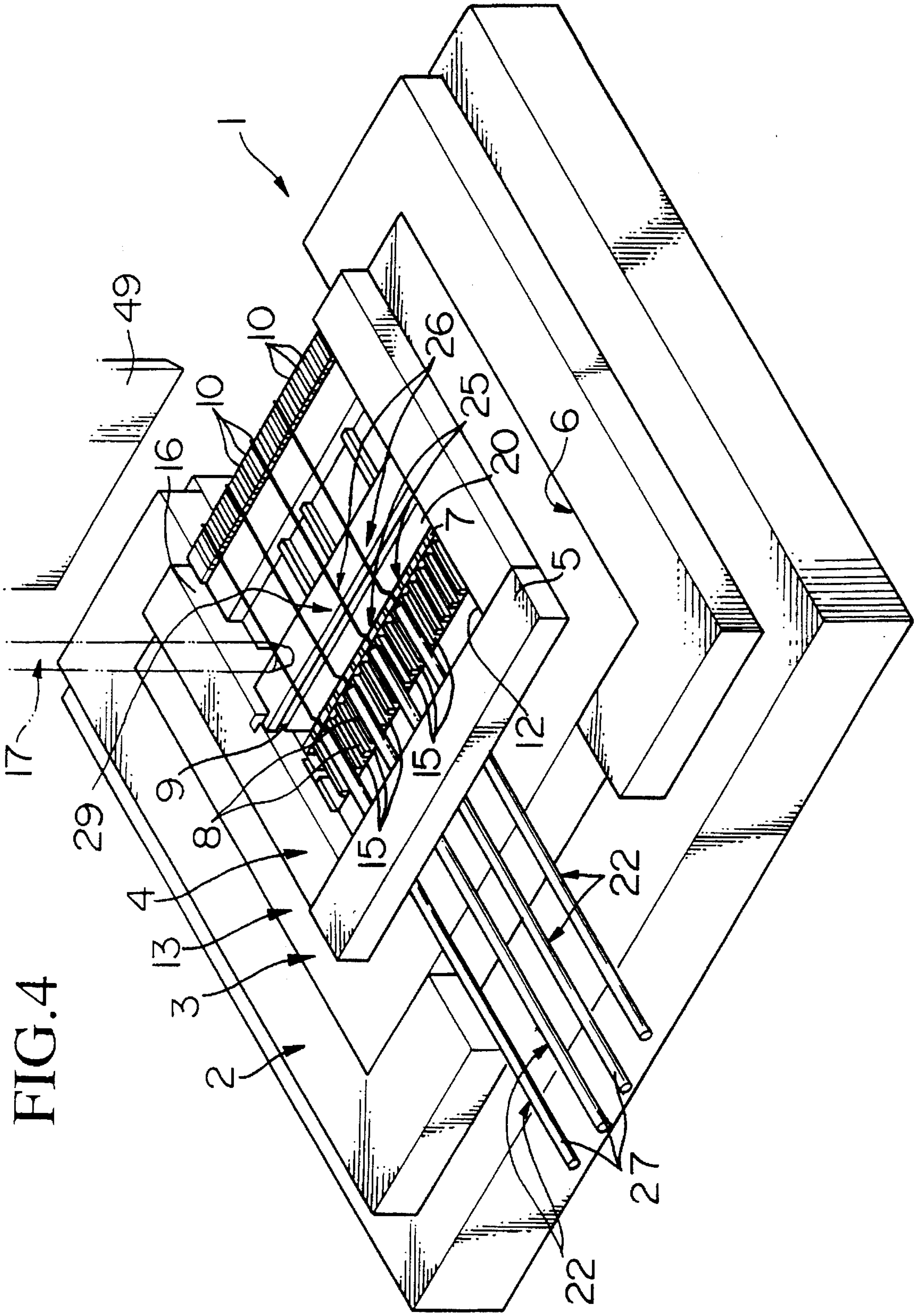
FIG. 4 is a perspective view showing the wire assembling operation using the wire assembling apparatus of the present invention.
Figure 5:
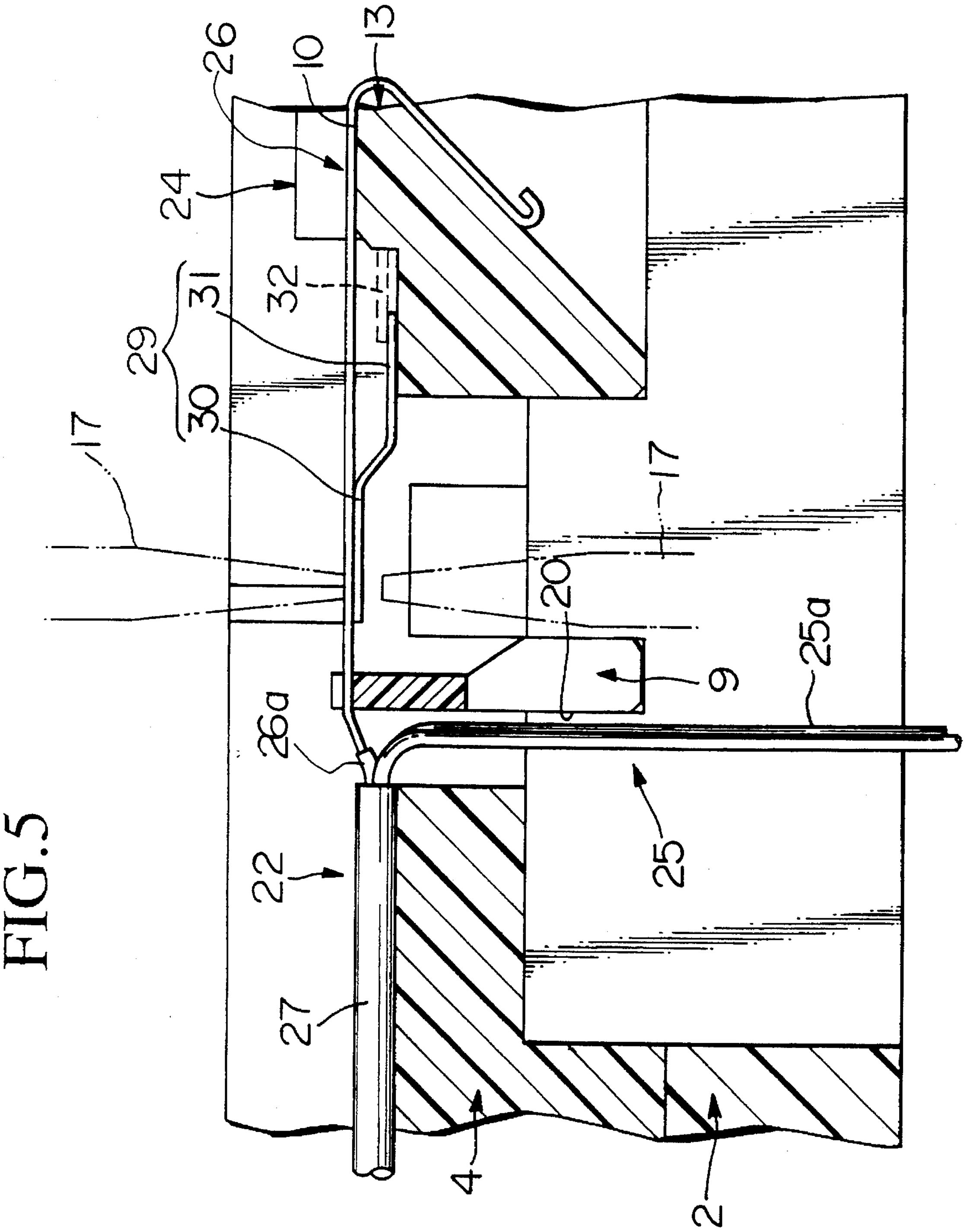
FIG. 5 is a cross sectional view showing a method of connecting the second wire.
Figure 6:
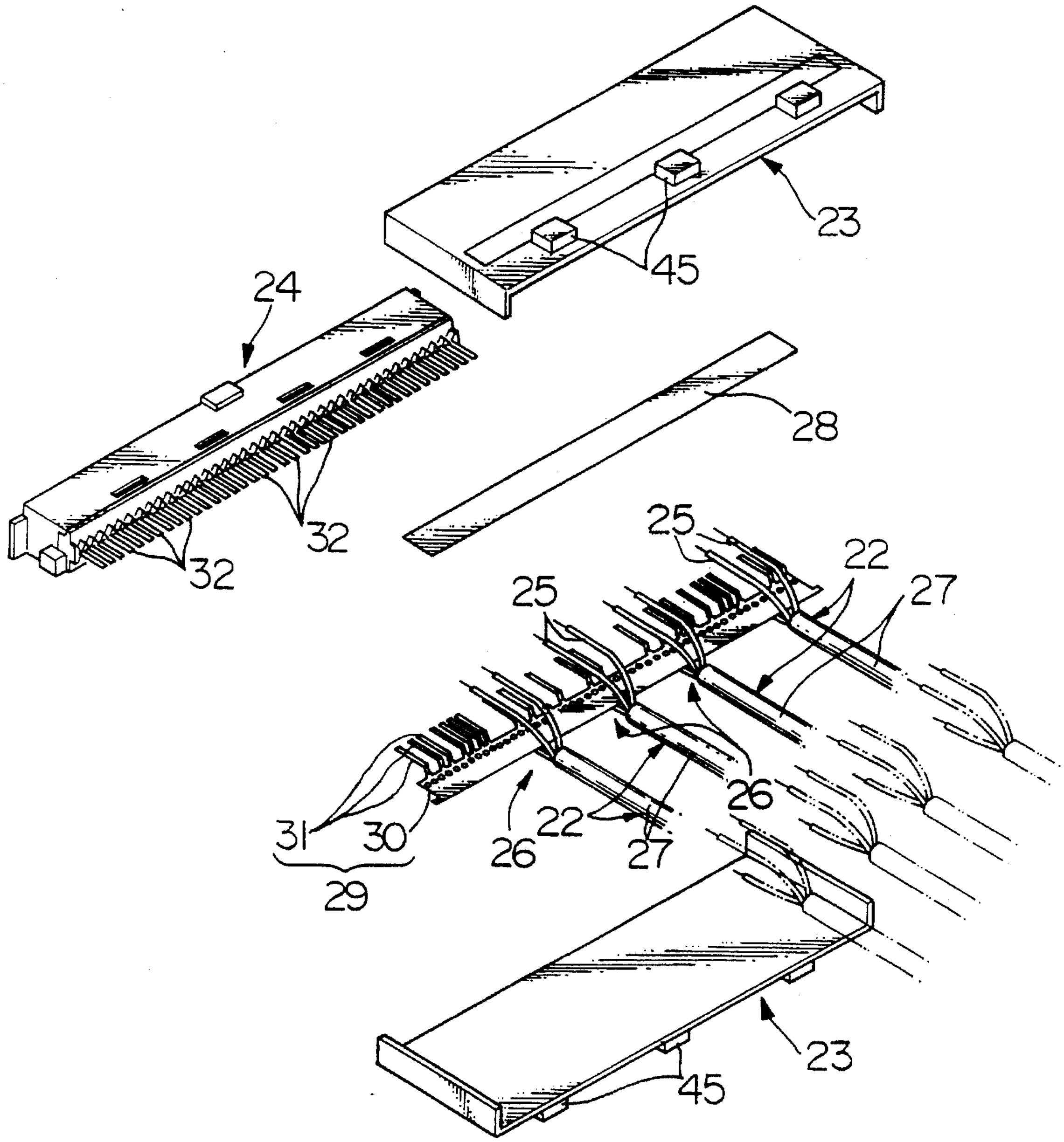
FIG. 6 is a perspective view for explaining the cable wire assembling operation of the embodiment.
Figure 7:
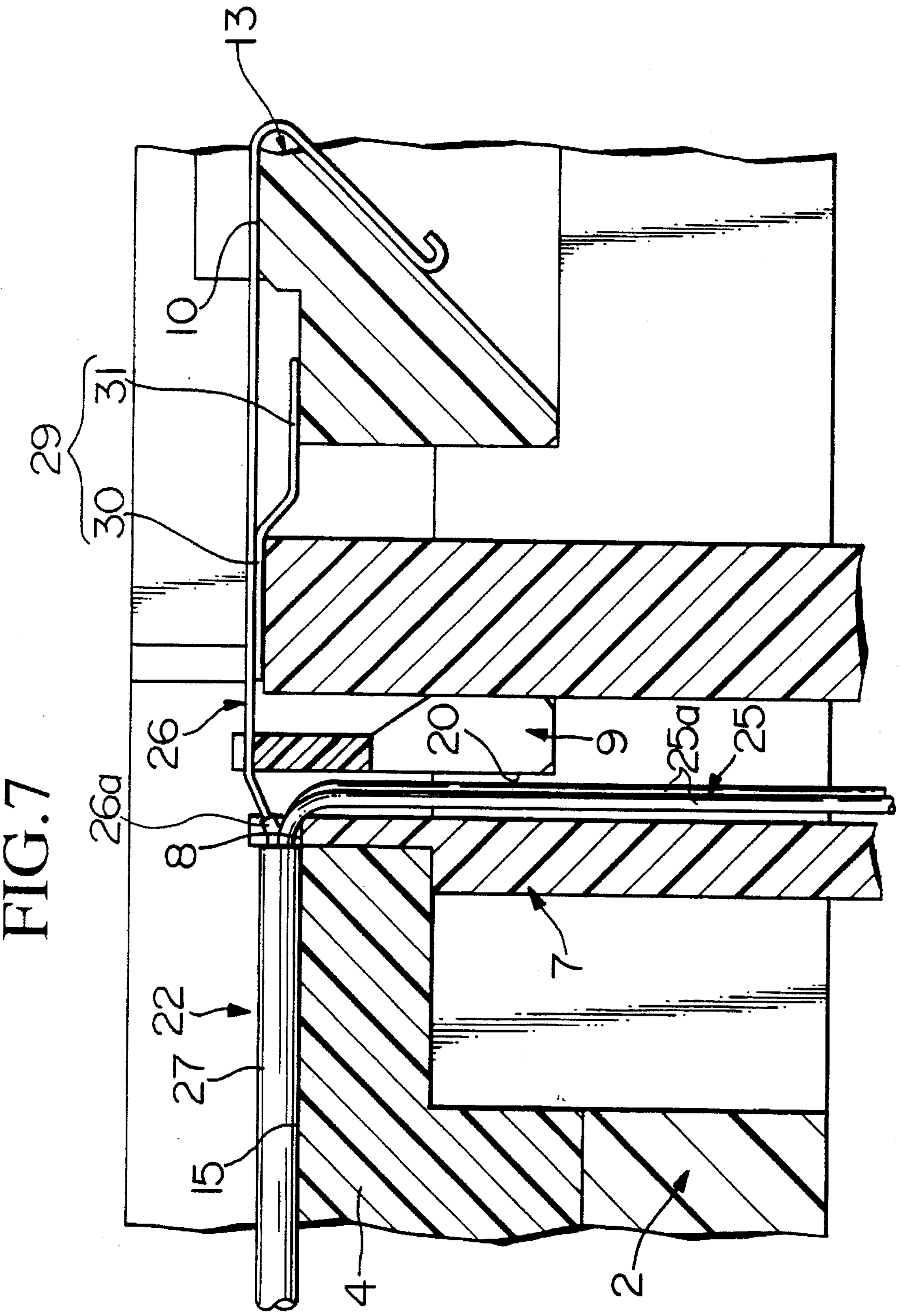
FIG. 7 is a cross sectional view of the embodiment shown in FIG. 4 showing a method of connecting the second wire to the coupling section.

As shown in FIGS. 1 and 4, the work base 2 is provided with a carrier section 6 for carrying the wire guiding jig 3; and a cable frame 7 which handles the signal wires 25 and the ground wires 26 as a unit. The cable frame 7 has a bottom engaging part to couple with the carrier section 6; and retaining grooves 8 at the top part thereof for inserting the signal wires 25 and the ground wires 26 of each cable 22.

Figure 10:
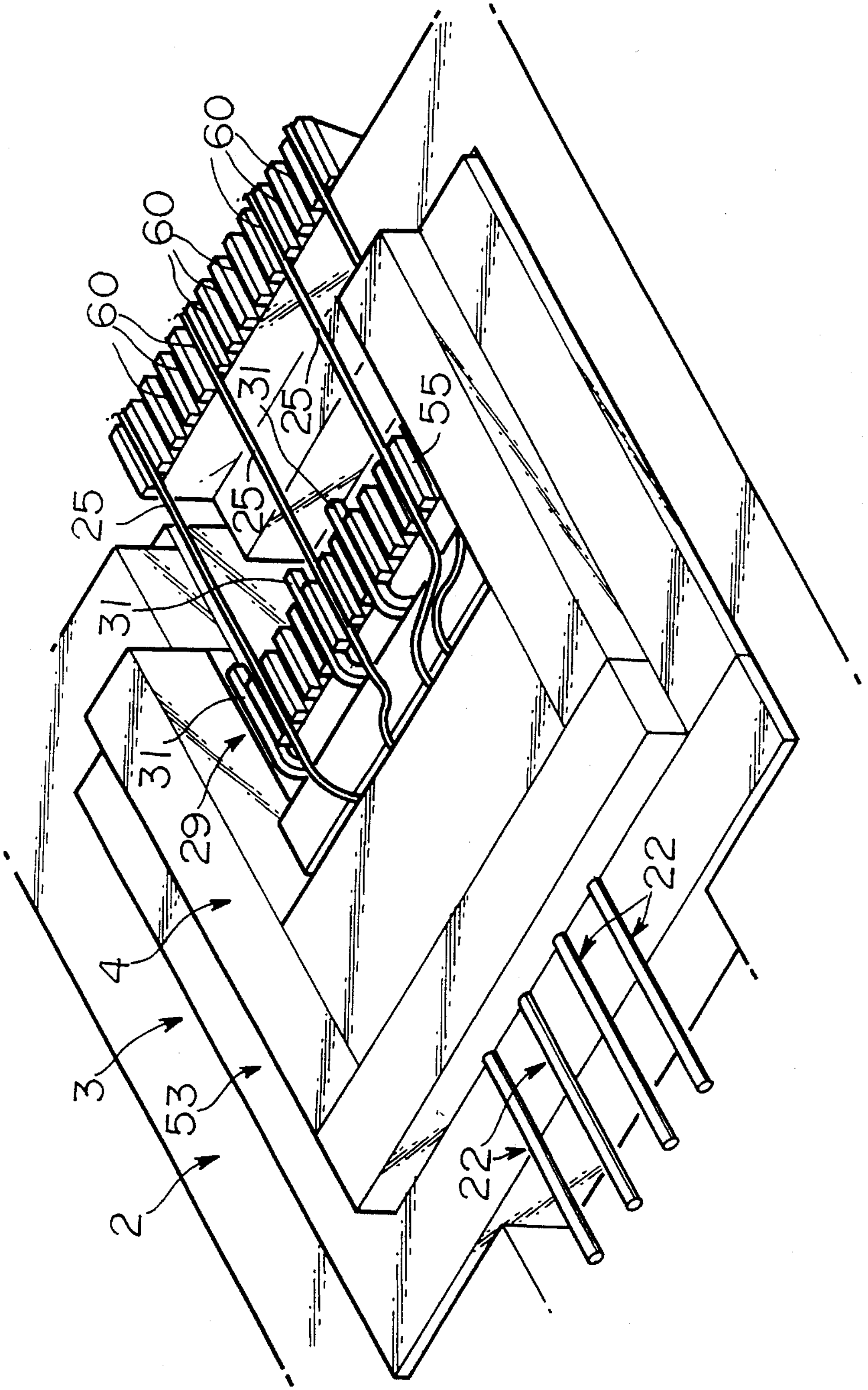
FIG. 10 is a perspective view illustrating the first wire assembling operation.

As shown in FIG. 1, the wire guiding jig 3 comprises: a signal wire block 53 (first block) shown in FIG. 10 which guides/holds the signal wires 25; and a ground wire block 13 (second block) which guides/holds the ground wires 26. The ground wire block 13 is provided with: a wire retaining grooved plate 9 which receives the ground wires 26 extending from each of the cables 22; and the ground wire setting grooves 10 for inserting the end part of the ground wire 26; and an engaging opening 12 for receiving the cable guiding frame 4. The side walls of the opening 12 are provided with frame channels 11 for engaging with the cable frame 7; and wire through space 20 (FIG. 4) partitioned by the cable frame 7 and the wire retaining grooved plate 9.

The signal wire block 53 is used in place of the ground wire block 13 to connect the signal wires 25. The signal wire block 53 is provided with signal wire guiding grooves 60 (FIG. 10) for inserting the signal wires 25; and an engaging opening 53*a* for engaging the cable guiding frame 4. A signal wire retaining section 55 (FIG. 8) is provided on the upper surface of the signal wire block 53 to retain/guide the comb part 31 of the ground section 29 and the signal wires 25.

Figure 12:
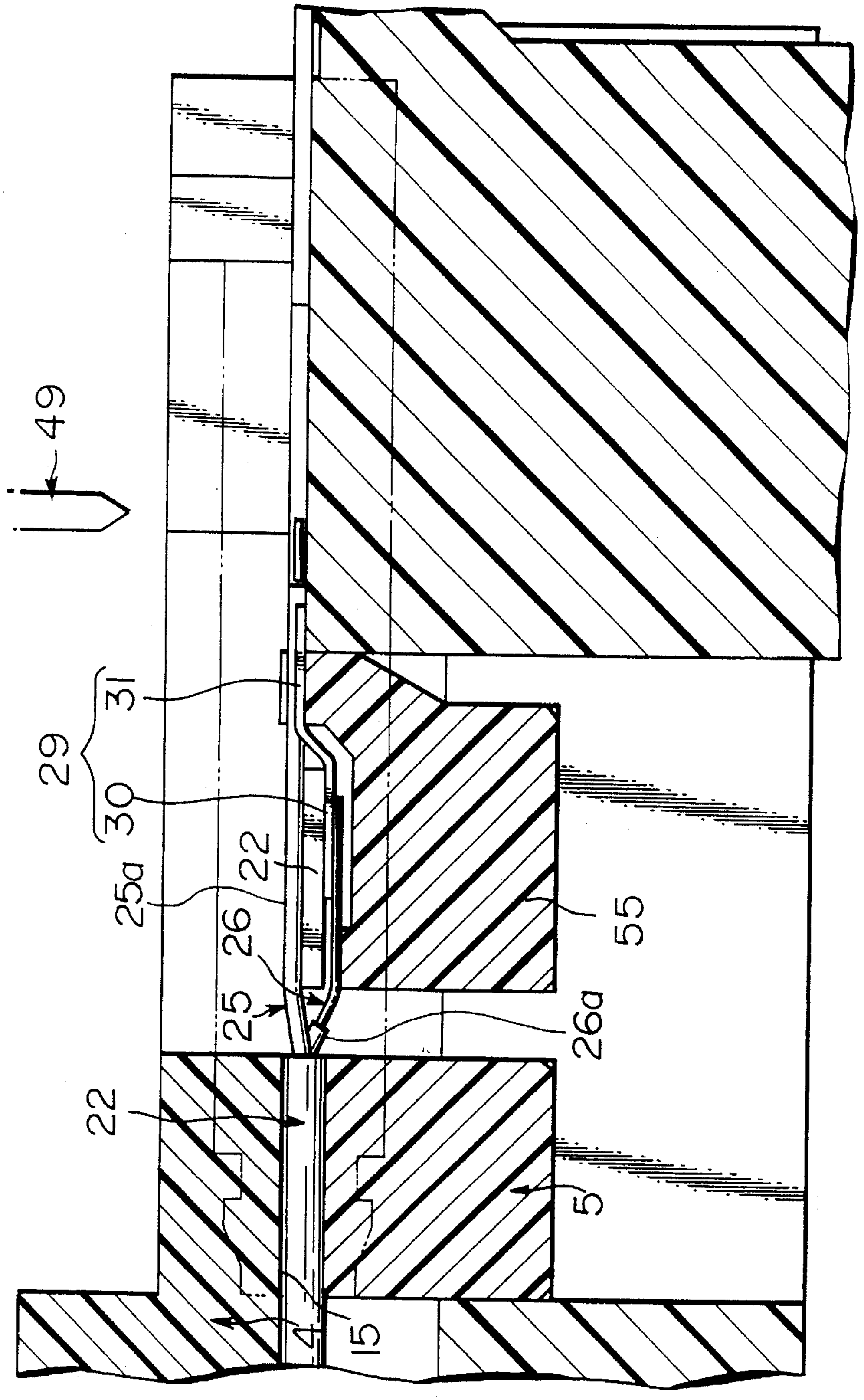
FIG. 12 is a cross sectional view showing the first wire shown in FIG. 11 after a severing operation.

Shown in FIG. 4 by a dashed line is a bonding means 17 freely translatable horizontally and movable vertically between the ground wire setting grooves 10 and signal wire setting grooves 60 and the wire retaining grooved plate 9. This bonding means 17 can be one of many bonding means such as automatic soldering apparatus and spot welding. In the vicinity of the bonding means 17 is disposed a severing means 49 (FIG. 12) freely translatable in the horizontal and vertical directions. The severing means is capable of cutting the comb part 31 of the ground section 29 and the ground wires 26 at specific locations.

The cable guiding frame 4 (FIG. 1) is provided with: cable guiding grooves 15 for inserting the ends of a plurality of cables 22; and a cable guiding base 14 which arranges the cables 22 laterally. The cable guiding base 14 is provided with a cable clamp 5 which holds the laterally placed cables 22. The cable guiding frame 4 is provided with an opening 16 for receiving either the ground wire setting grooves 10 when the ground wire block 13 is being used (shown in the embodiment illustrated in FIG. 4) or the signal wire retaining section 55 when the signal wire block 53 is being used.

Next, the method of assembling the cables 22 using the cable terminal end assembling apparatus 1 described above will be presented.

In this method, first the ground section 29 is placed on the cable guiding frame 4. The cable clamp 5 is removed from the cable guiding frame 4, and a plurality of cables 22 are arranged laterally on the cable guiding frame 4 as shown in FIG. 4, by inserting the end of the cable 22 individually into the cable guiding grooves 15. At this time, the ends of the insulation sheath 27 of the cables 22 are aligned against the cable frame 7. By so doing, the signal wires 25 and the ground wires 26 will ride over the cable frame 7, the signal wires 25 are inserted into the wire through space 20 and the ground wires 26 are individually inserted into the ground wire setting grooves 10. The ground wires 26 are then arranged on the common ground part 30 of the ground section 29. At this stage the cable clamp 5 is placed on top of the plurality of cables 22 placed on top of the cable guiding base 14, and is fastened down suitably to clamp down the cables 22.

After clamping down the cables 22, the ground wires 26 are connected to the common ground part 30 of the ground section 29 by means of the bonding means 17. In this operation, the insulation sheath 27 is pre-removed from the end of the cable 22, and the bared end of the ground wire 26 is individually inserted into the ground wire guiding grooves 10, and the ground wire 26 is placed under tension, and the insulation 26*a* is pre-removed from the ground wires 26 which are connected to the common ground part 30 by means of the bonding means 17. The excess ends of the ground wires 26 are removed with the severing means 49 to produce a specific length.

Figure 8:
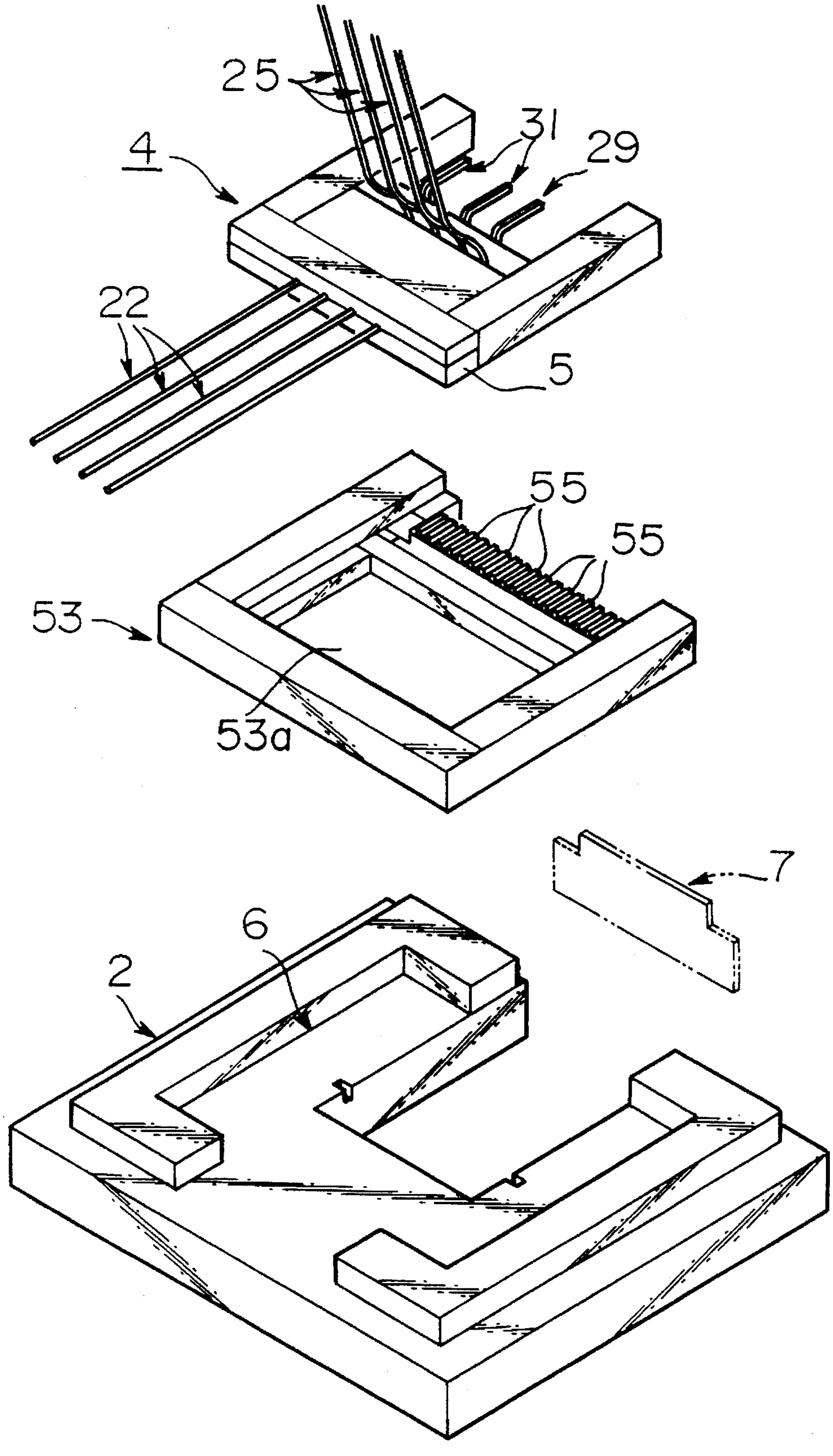
FIG. 8 is a perspective view to explain the connecting operation of the first wire.

Next, the ground wire block 13 is removed from the carrier section 6 of the work base 2, and the cable guiding frame 4 is taken out of the opening 12 of the ground wire block 13, thereby pulling out the signal wires 25 from the wire through space 20. While maintaining the hold on the plurality of cables 22 by the cable clamp 5 of the cable guiding frame 4, the cable guiding frame 4 is turned over, thereby exposing the reverse side of the cable 22. The state of the signal wires 25 at this stage is shown in FIG. 8. The ground wire block 13 is replaced with the signal wire block 53, and the cable frame 7 is removed from the work base 2.

Figure 9:
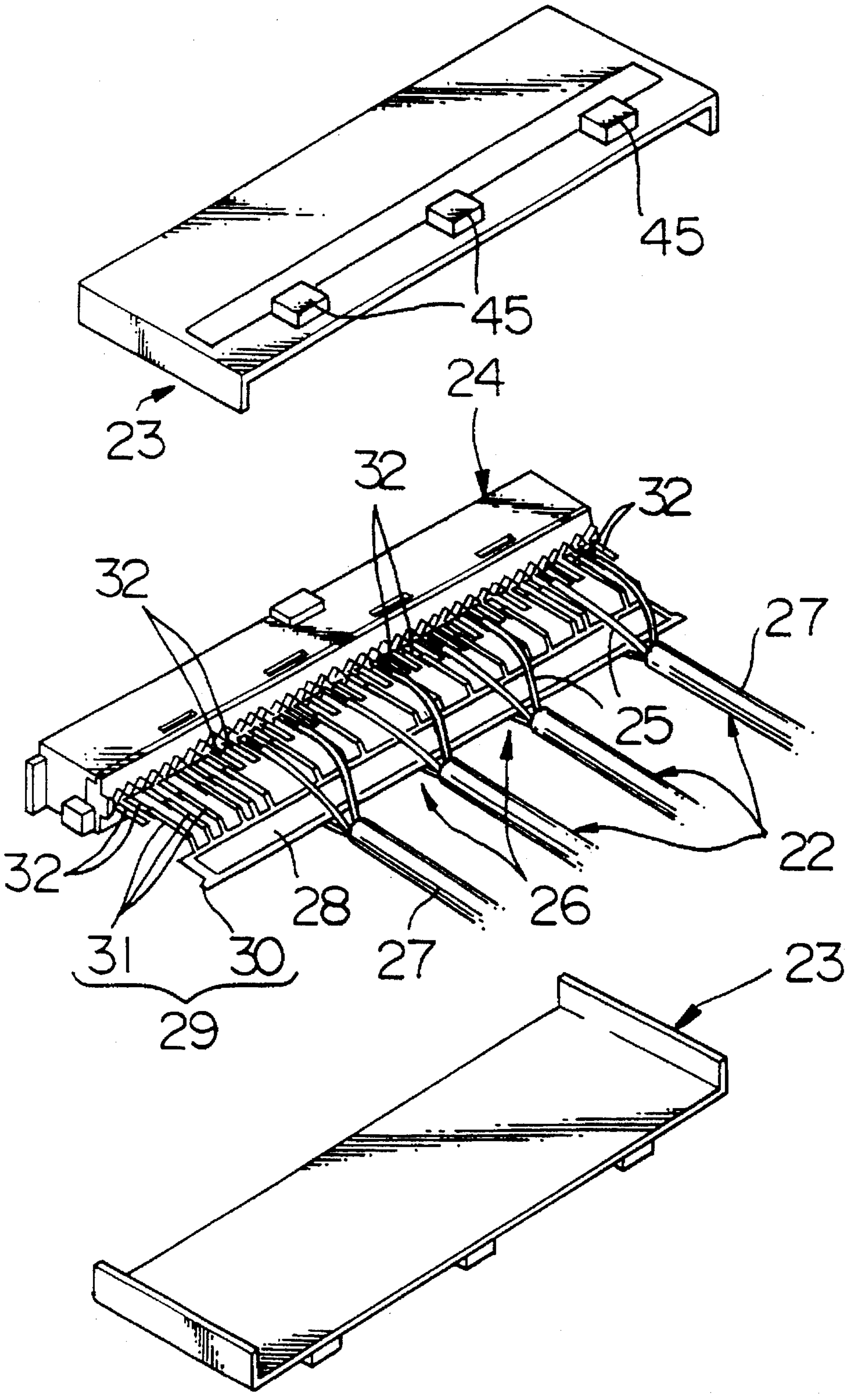
FIG. 9 is a perspective view illustrating the completion of the wire assembling operation of the first wire.
Figure 11:
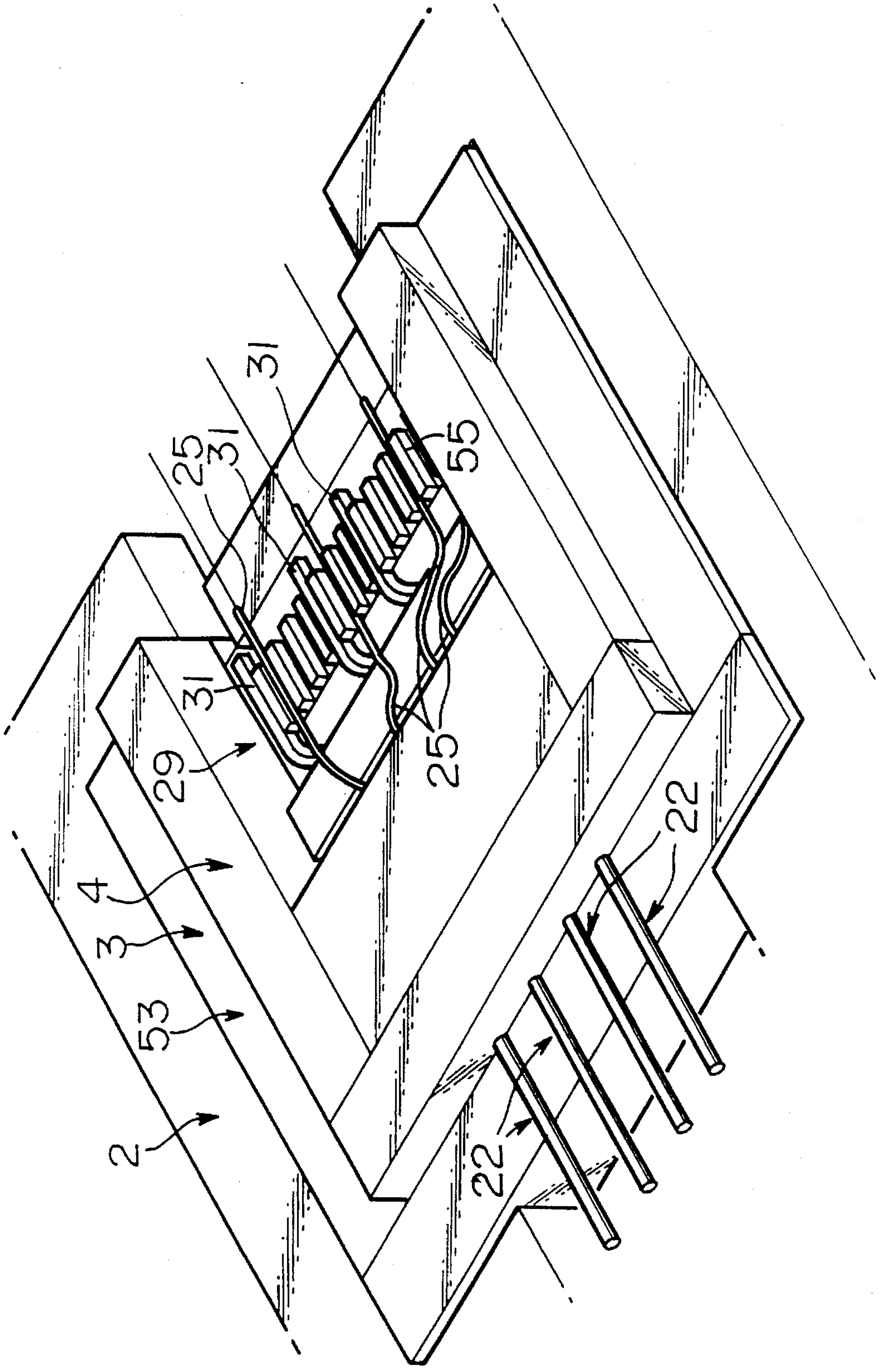
FIG. 11 is a perspective view illustrating the first wire assembling operation.

The signal wire block 53 is now placed on the work base 2, and the signal wire block 53 is engaged with the cable guiding frame 4. At this time, the insulation plate 28 is disposed on the common ground part 30 of the ground section 29 as shown in FIG. 9. After this operation is completed, individual signal wire 25 is inserted into the signal wire guiding grooves 60 (FIG. 10) of the signal wire block 53 (FIG. 8) and into the signal wire retaining section 55. Placing the signal wire 25 under tension, the removal operation of the insulation 25a from the signal wire 25 is carried out to produce the condition shown in FIG. 11. The removal operation of the insulation 25a is carried out using a thermal blade or a laser device.

Figure 13:
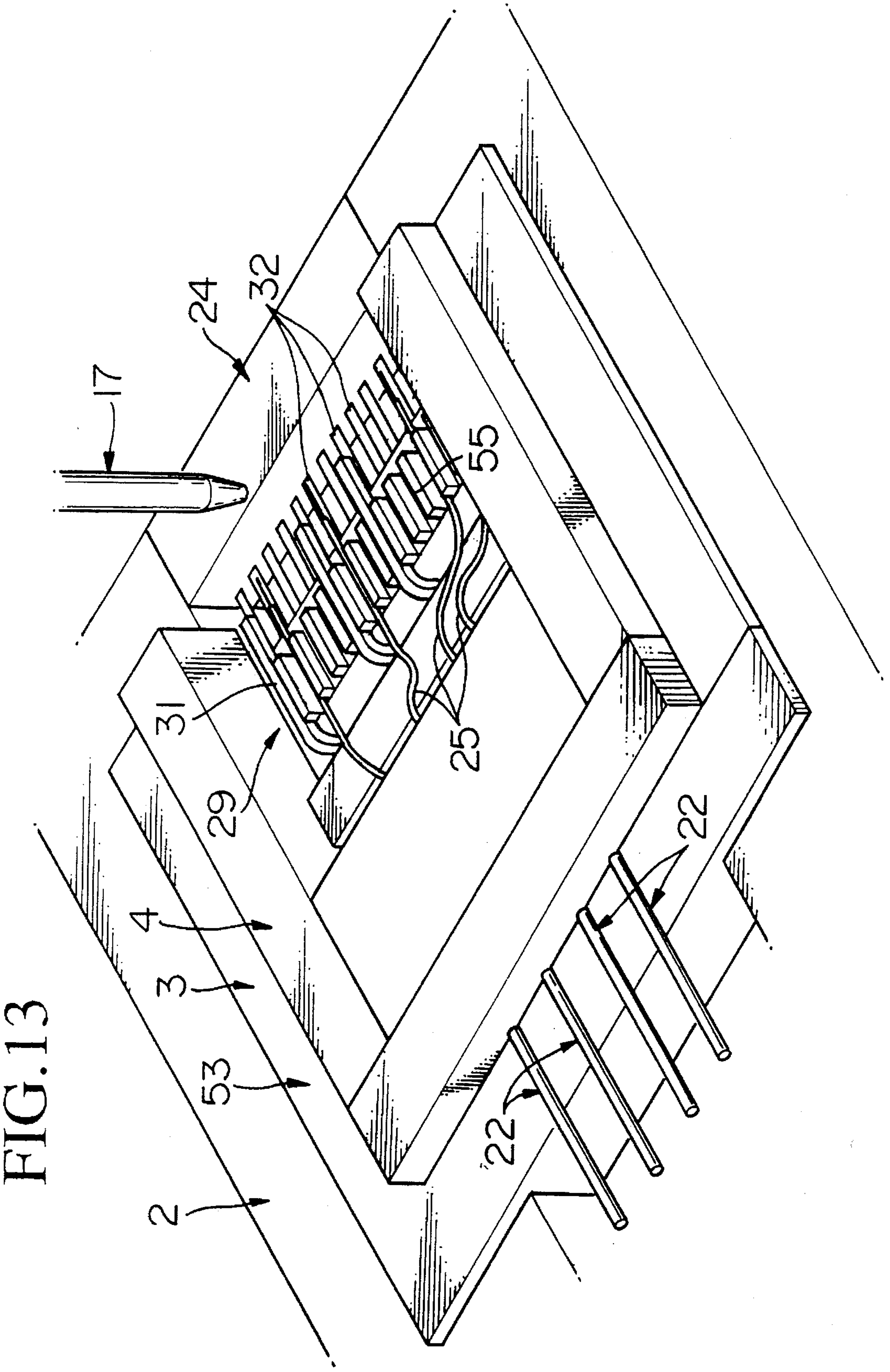
FIG. 13 is a perspective view showing the connecting operation of the severed first wire.
Figure 14:
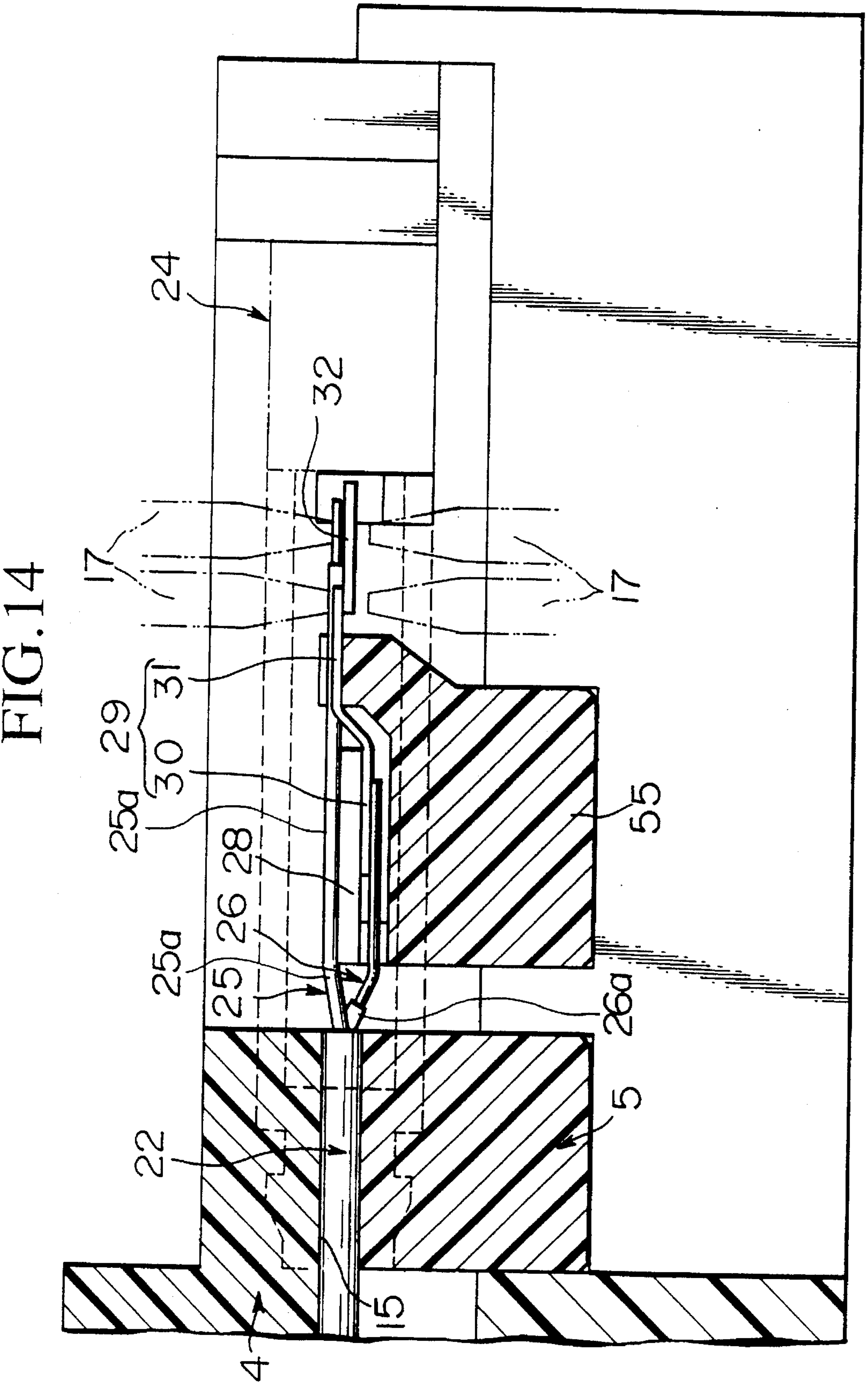
FIG. 14 is a cross sectional view of the apparatus shown in FIG. 13.
Figure 15:
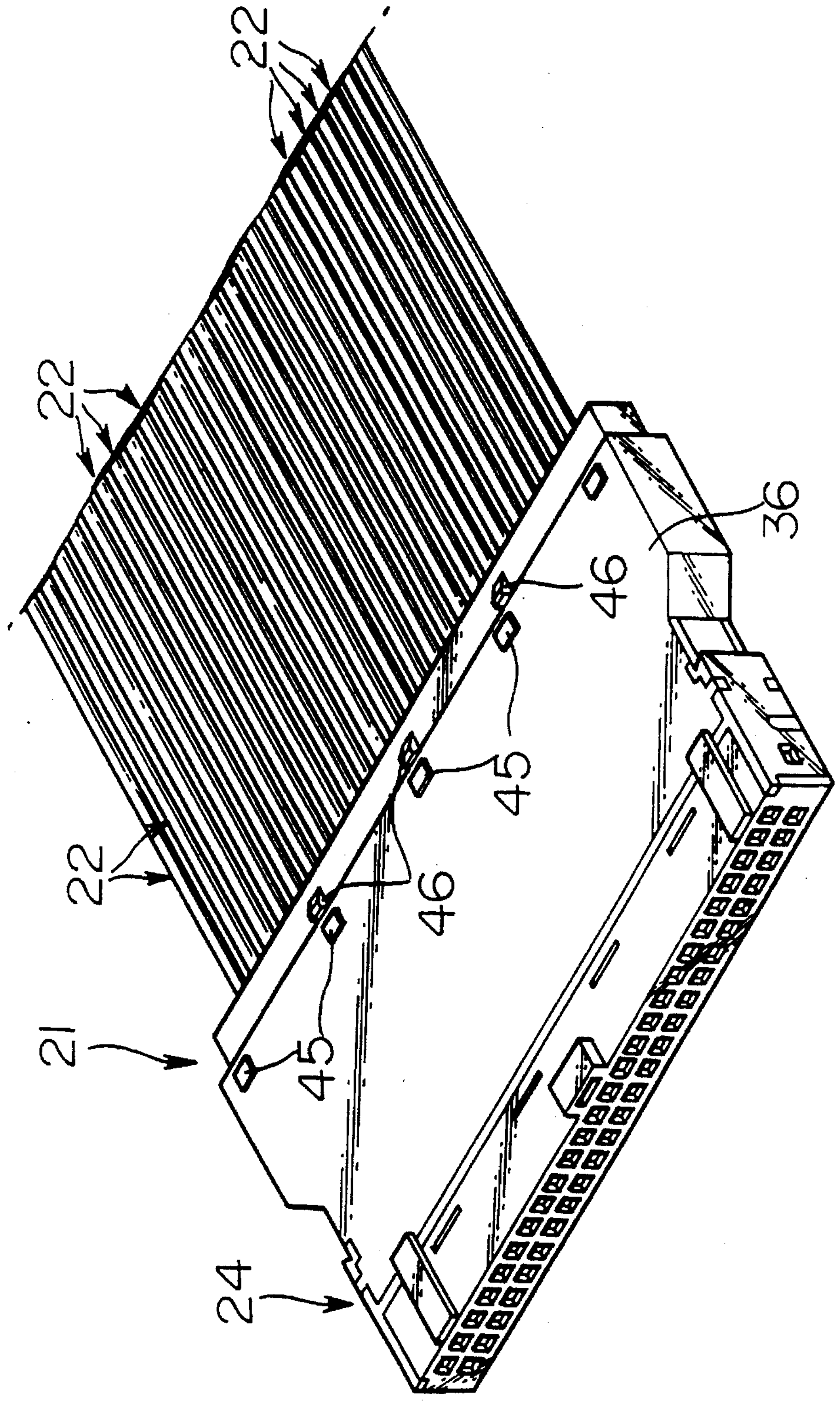
FIG. 15 is a perspective view of the embodiment of the cable assembly of the present invention.

The terminal ends of the signal wire 25 are thus exposed, and the length of the signal wires is adjusted to a specific dimension by means of the severing means 49 such as a knife. Next, bonding means 17 is operated to connect each terminal ends of the signal wires 25 and the comb part 31 of the ground section 29 to the specific contact strips 32 of the coupling section 24, as shown in FIGS. 13 to 14.

Next, the cable guiding frame 4 is removed from the signal wire block 53, and the cable clamp 5 is removed from the cable guiding frame 4, and the signal wires 25 and the ground wires 26 are taken out of the cable guiding frame 4, and the casing 23 is placed so as to protect the signal wires 25 and the ground wires 26 over the region between the end of the cable 22 to the contact strips 32 (refer to FIG. 9). The casing 23 is then filled with a molding 34. The exterior surfaces of the casing 23 are covered with an overmolding 36 to produce terminal end assembly 21 of the cable 22.

Because the cable terminal end assembling apparatus 1 comprises: a cable guiding frame 4 which laterally arranges the ends of a plurality of cables 22; a cable clamp 5 for clamping the cables 22 arranged laterally on the cable guiding frame 4; a wire guiding jig 3 for inserting the signal wires 25 and the ground wires 26; and bonding means 17 for bonding the signal wires 25, ground wires 26 and the ground section 29 to the coupling section 24; it becomes possible to clamp a plurality of laterally arranged cables 22 with the cable clamp 5, to insert the signal wires 25 and the ground wires 26 respectively into the wire guiding jig 3 and to bond the wires 25, 26 to the coupling section 24 with the bonding means 17. Therefore, it is possible to compactly arrange the terminal ends of the plurality of cables 22, to facilitate the wiring of the plurality of cables 22, and to automate the bonding process of the signal wires 25 and the ground wires 26 to the coupling section 24. The overall end effect is that the production operations associated with wiring and bonding of the cable terminal ends are facilitated and the production time shortened.

By arranging the bonding means 17 adjacent to the wire guiding jig 3, and by providing a through space 20 on the wire guiding jig 3, it becomes possible to divide the signal wires 25 and the ground wires 26 into separate directions by inserting the signal wires 25 into the through space 20. Bonding is performed with the wires 25, 26 separated, thus assuring that the wires 25, 26 will not come into contact with each other during the bonding operation thereby improving the performance of the bonding operation.

By providing the wire guiding jig 3 separately with a signal block 13 for insertion of individual signal wires 25, and with a ground block 53 for insertion of individual ground wires 26 as well as with a cable frame 7 for insertion of signal wires 25 and the ground wires 26 as a unit, it becomes possible to align the ends of a plurality of cables 22 to the cable frame 7, thereby enabling to fix the length of the wires 25, 26 to specific lengths required for each. The bonding operation is improved by providing proper required length for each of the wires 25, 26.

With respect to the advantages of the method of assembling the terminal ends using the apparatus of the present invention, the following point should be noted.

The assembling procedure allows the separation of the signal wires 25 from the ground wires 26 of a plurality of cables 22 arranged laterally on the cable guiding frame 4, allows the insertion of individual ground wires 26 into the ground wire guiding block 13 of the wire guiding jig 3, and the ground wires 26 are bonded to the ground section 29 while holding down the cables 22 with the cable clamp 5. This procedure allows the lateral arrangement of a plurality of cables 22 as well as the separation of the signal wires 25 and the ground wires 26 to be maintained, and permits bonding of all the ground wires 26 simultaneously to the coupling section 24. Therefore, the productivity of the bonding operation of the ground wire 25 is improved.

The above processing stage is followed by the introduction of an insulation plate 28 between the signal wires 25 and the ground wires 26, and the bonding of the signal wires 25 to the coupling section 24, and the bonding of the ground section 29 to the contact strips 32 in the coupling section 24. This procedure assures that the signal wires 25 and the ground wires 26 are insulated from each other even when the surrounding space is filled with a molding 34. The insulation plate 28 acts as a directional guide to guide the flow of the resin for making the molding 34, thereby assuring that the terminal ends of the cables 22 are securely and safely secured to allow a compact arrangement of the cables 22.

The insertion of the signal wires 25 through the through space 20, as well as the insertion of an insulation plate 28 between the signal wires 25 and the ground wires 26 serve to assure positive separation of the wires 25, 26. Therefore, there is no danger of bonding the signal wires 25 during bonding of the ground wires 26, and the reliability of the bonding operation of the signal wires 25 is assured.

Furthermore, the procedure of aligning a plurality of cables 22 arranged laterally against the cable frame 7 permits efficient bonding of the ground wires 26 arranged side by side to the ground section 29 quickly and reliably. The process of reversing the cable guiding frame 4 allows quick removal of all the signal wires 25 from through space 20. Then, an insulation plate 28 is introduced between the signal wires 25 and the ground wires 26, and the signal wires 25 are then inserted individually into the signal wire guiding block 53 and the laterally arranged signal wires 25 and the ground section 29 are bonded to the coupling section 24. This procedure permits efficient and reliable bonding operation of the signal wires 25 with the ground section 29.

Furthermore, the process of bonding the ground wires 26 via the ground section 29 to the specific contact strips 32 in the coupling section 24 eliminates the necessity of bonding the ground wire 26 to the required individual terminals of the coupling section 24. Therefore, the efficiency of the wiring operation for the ground wires 26 is improved. The process of bonding the comb part 31 of the ground section 29 to the coupling section 24 also promotes efficient bonding operation of the ground section 29, because the procedure allows customization of the comb part 31 to particular wiring requirements of the electrical device so as to allow the comb sections 31 to be bonded to specific contact strips 32 in the coupling section 24.

Figure 18:
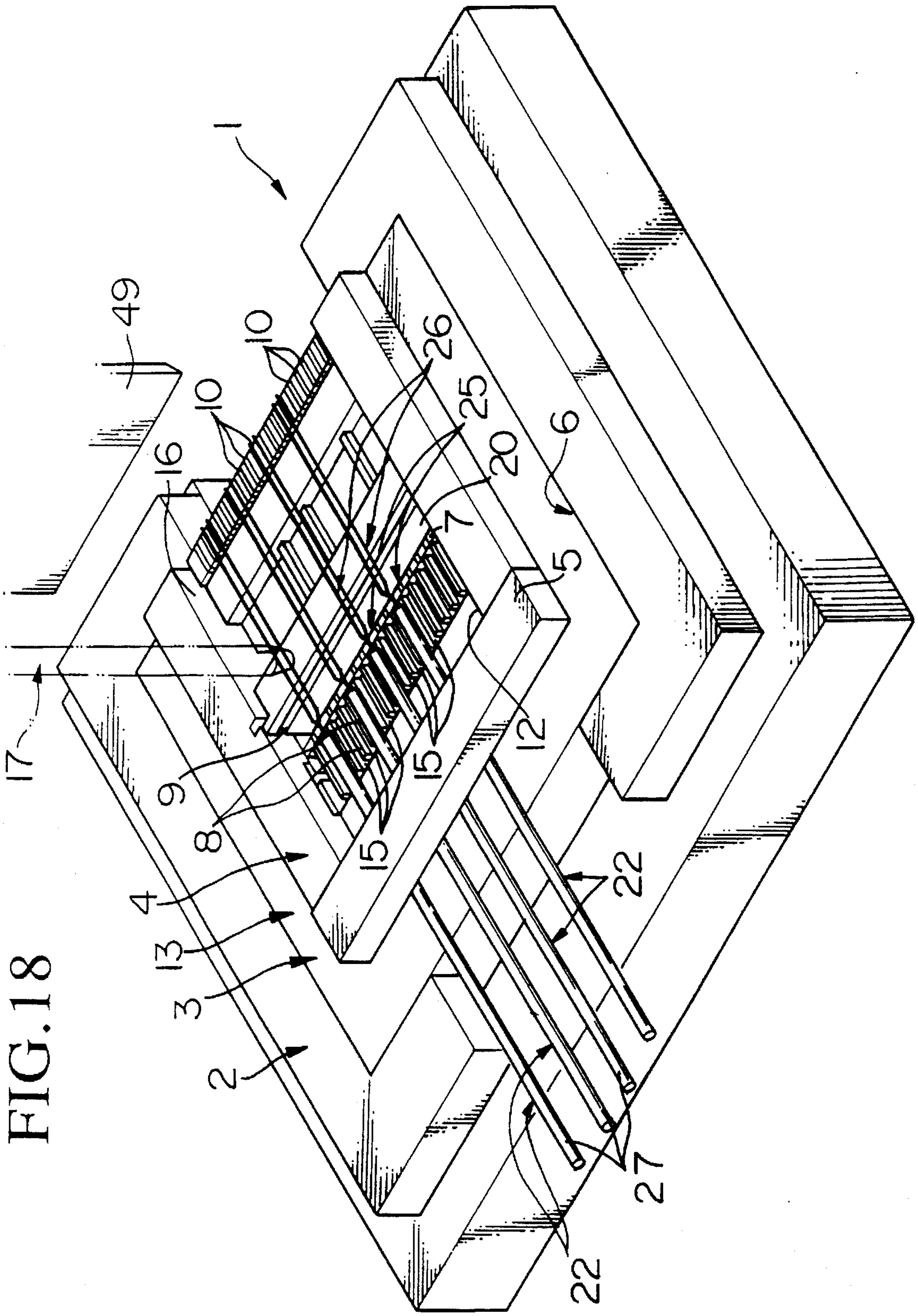
FIG. 18 is a variation of the case of the embodiment shown in FIG. 4.
Figure 19:
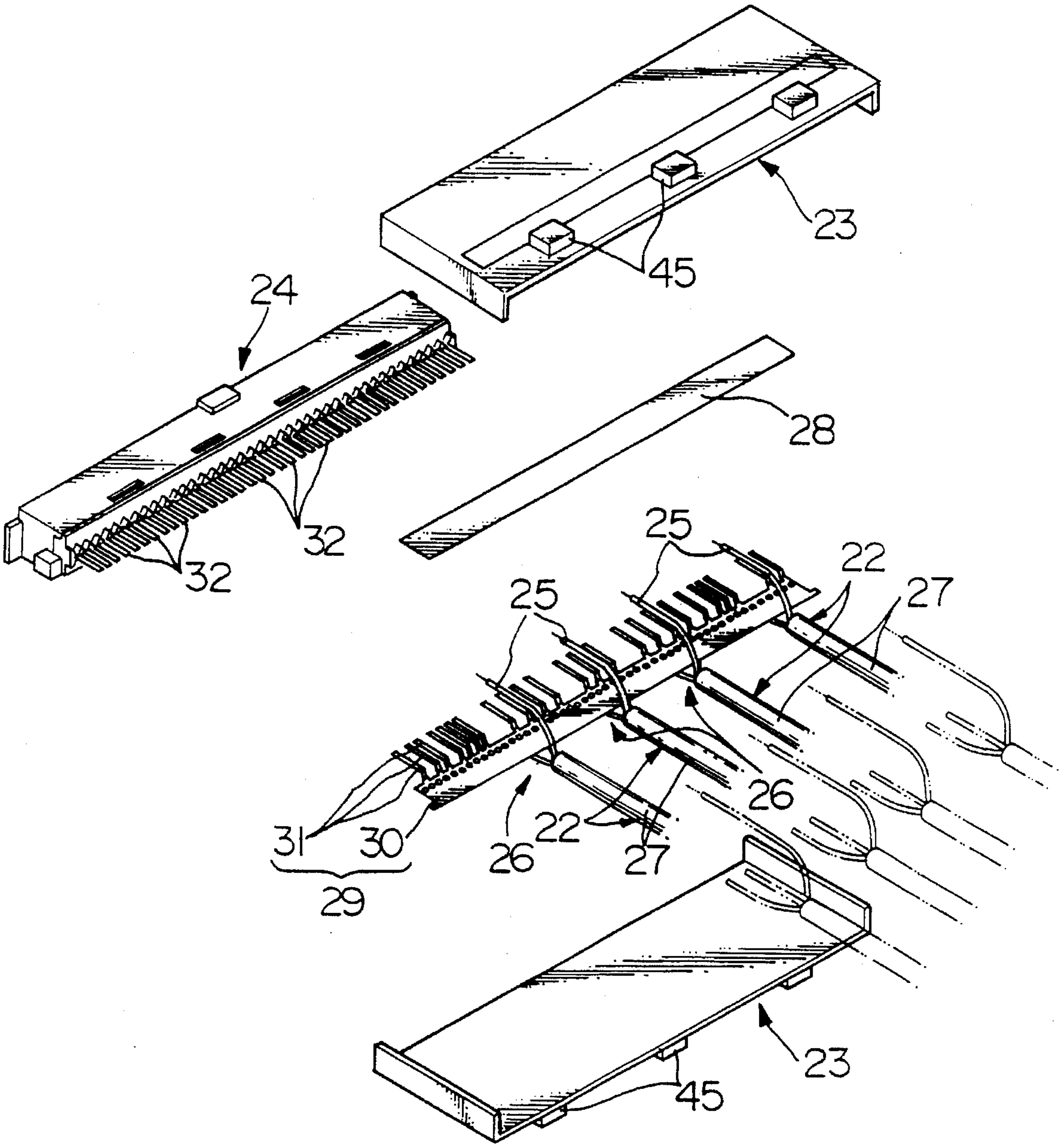
FIG. 19 is a variation of the case of the embodiment shown in FIG. 6.
Figure 20:
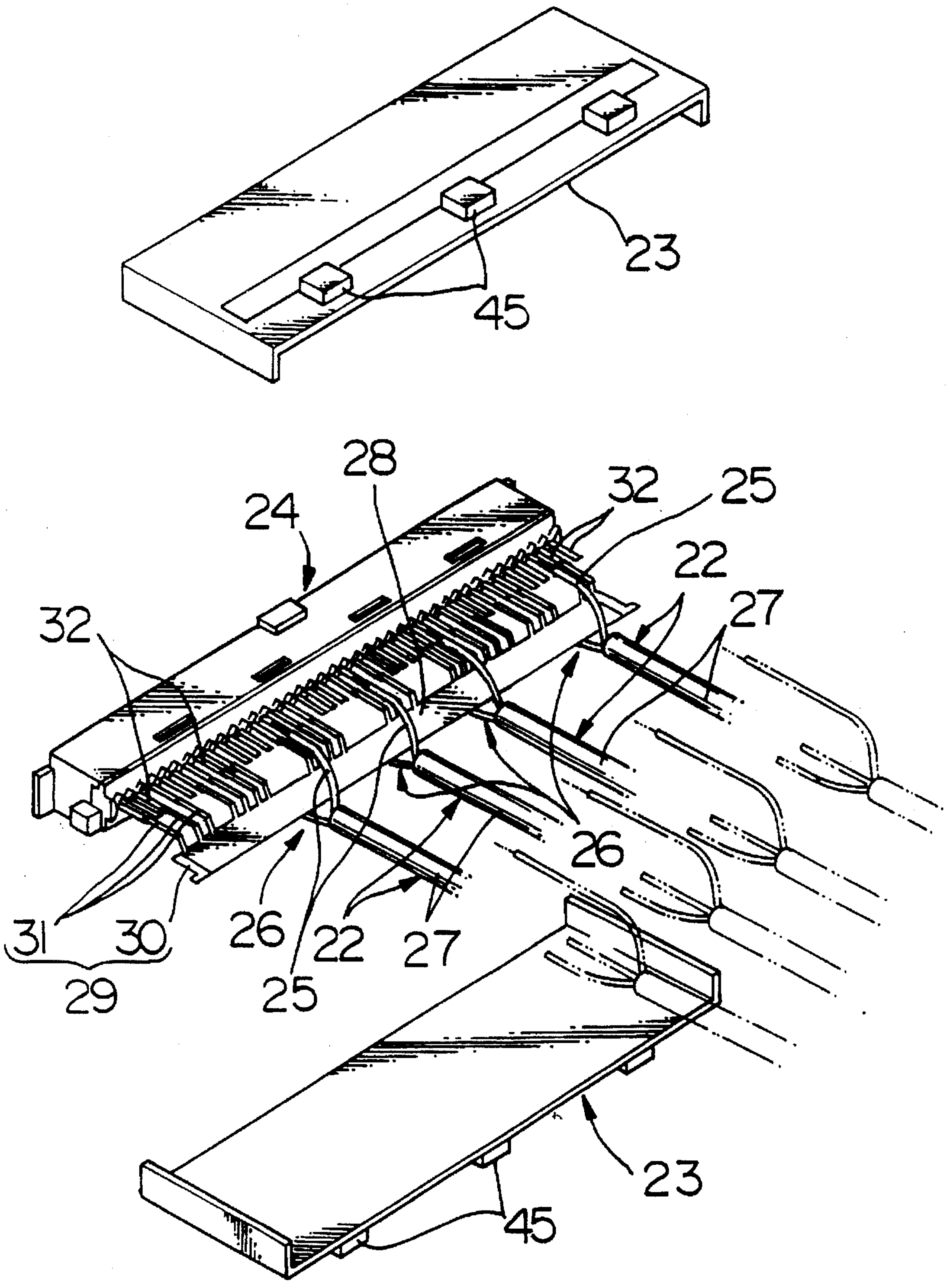
FIG. 20 is a variation of the case of the embodiment shown in FIG. 9.

In the above embodiment, one ground wire 26 and two signal wires 25 were used. However, it is permissible to use two ground wires 26 and one signal wire 25 depending on the circuit requirement, which are illustrated in FIGS. 18, 19 and 20. The method of wire assembly in these cases is the same as in the above embodiment, and the detailed explanations are omitted.

Figure 21:
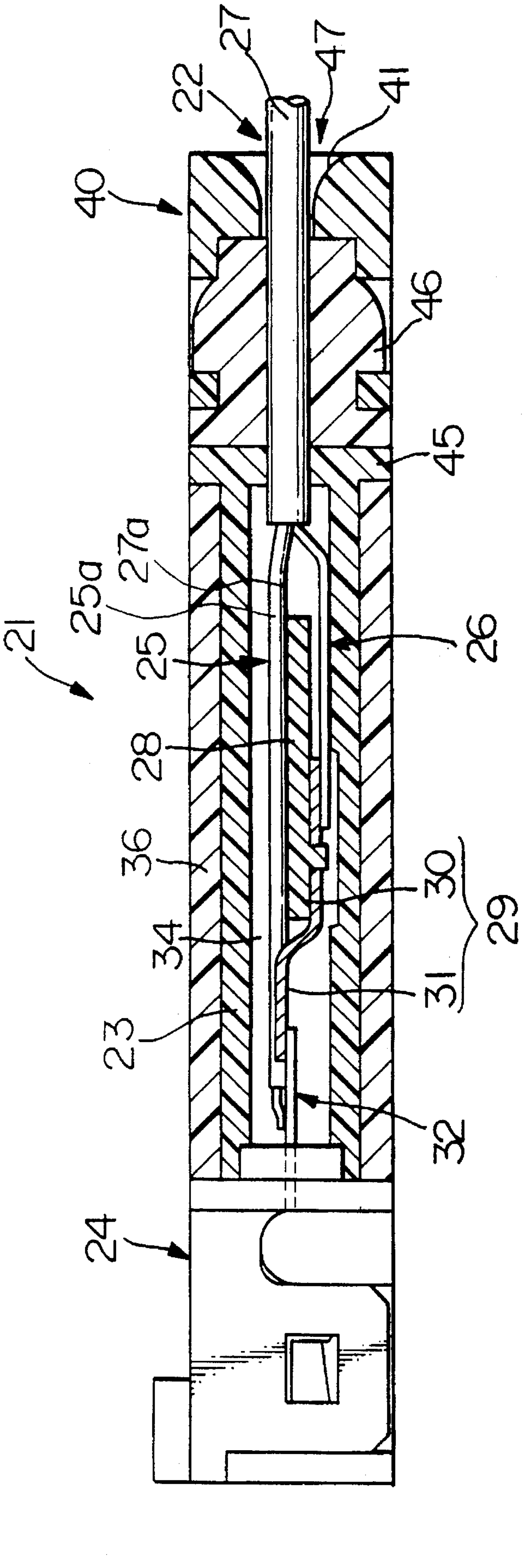
FIG. 21 is a variation of the case of the embodiment shown in FIG. 2.
Figure 22:
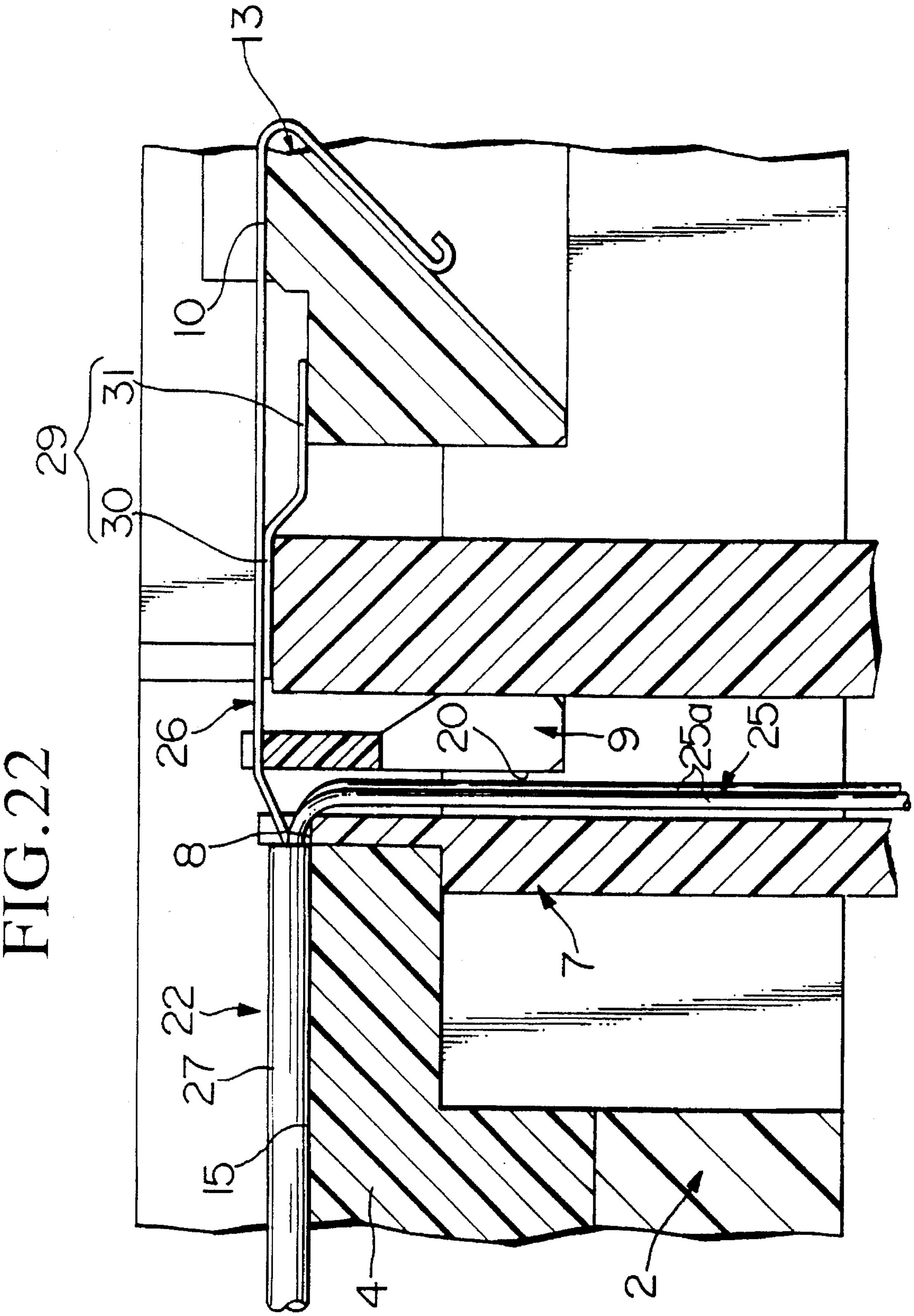
FIG. 22 is a variation of the-case of the embodiment shown in FIG. 7.

In the above embodiments, insulated wires were used. However, it is permissible to use one or two uninsulated wires which are normally used for ground wires. FIGS. 21 and 22 show the case of one uninsulated ground wire 26. The arrangement is basically the same as in the above embodiment, and the detailed explanations are omitted. However, if the ground wires are uninsulated, then there would be no need to carry out pre-removal of the insulation.

Further, the above embodiments were based on three wires in a sheath. However, there is no particular restriction in the number of wires. The number can be as low as two, involving one signal wire and one ground wire, or both signal wires and ground wires can be present in a plurality within a sheath.

It should also be noted that the present invention is not limited to the particular embodiments shown, but many variations of the basic concept of combining common connections and customized connections are possible.

What is claimed is:

1. A method of assembling terminal ends of a plurality of cables having at least one first wire and at least one second wire, said method comprising the steps of:

(a) disposing a plurality of cables laterally on a cable guiding frame;

(b) separating said at least one first wire from said at least one second wire;

(c) inserting a plurality of said second wires individually into a wire guiding block;

(d) clamping said plurality of cables between said cable guiding frame and a cable clamp means;

(e) bonding the plurality of said second wires to a ground section with a bonding means;

(f) disposing an insulation plate between a plurality of said first wires and the plurality of said second wires; and (g) bonding said first wires to any of a plurality of contact strips of a coupling section according to a predetermined wiring pattern and bonding said ground section to any of said plurality of contact strips of the coupling section according to the predetermined wiring pattern.

2. The method according to claim 1, wherein the plurality of contact strips of the coupling means are arranged in a single row.

3. The method of claim 2, wherein some of said plurality of contact strips are left unconnected.

4. A method of assembling terminal ends of a plurality of cables having at least one first wire and at least one second wire, said method comprising the steps of:

(a) disposing a plurality of cables laterally on a cable guiding frame;

(b) disposing a plurality of said first wires and a plurality of said second wires in a wire guiding block;

(c) clamping said plurality of cables between a cable guiding frame and a cable clamp means;

(d) separating said plurality of said first wires from said plurality of said second wires;

(e) inserting said plurality of said first wires individually into at least one through space;

(f) bonding said plurality of said second wires to a ground section with said bonding means;

(g) disposing an insulation plate between said plurality of said first wires and said plurality of said second wires; and (h) bonding said plurality of said first wires to any of a plurality of contact strips of a coupling section according to a predetermined wiring pattern and bonding said ground section to any of said plurality of contact strips of said coupling section according to said predetermined wiring pattern.

5. A method of assembling terminal ends of a plurality of cables having a first wire and a second wire, the method comprising the steps of:

(a) disposing a plurality of cables laterally on a cable guiding frame;

(b) aligning an end section of said cables against said cable frame;

(c) separating a plurality of said first wires from a plurality of said second wires;

(d) inserting said plurality of said second wires individually in a second block;

(e) holding said cables with a cable clamp means;

(f) bonding said plurality of said second wires to said ground section with a bonding means;

(g) turning a cable frame over so as to expose a bottom section of said cables;

(h) placing said cable frame on a first block;

(i) disposing an insulation plate between said plurality of said first wires and said plurality of said second wires;

(j) inserting said plurality of said first wires individually in said first block; and (k) bonding said plurality of said first wires to any of a plurality of contact strips of a coupling section according to a predetermined wiring pattern and bonding said ground section to any of said plurality of contact strips of the coupling section according to said predetermined wiring pattern.

6. A method of assembling terminal ends of a plurality of cables each having a first wire and a second wire, said method comprising the step of:

disposing the plurality of cables laterally on a cable guide frame;

separating the first wire from the second wire of each of the plurality of cables;

inserting the second wire of each of the plurality of cables into a wire guiding block;

clamping said plurality of cables between said cable guiding frame and a cable clamp means;

bonding the second wire of each of the plurality of cables to a ground section with a bonding means;

disposing an insulation plate between the first wire and the second wire of each of said plurality of cables; and bonding the first wire of each of said plurality of cables to any of a plurality of contact strips of a coupling section according to a predetermined wiring pattern and bonding said ground section to any of said plurality of contact strips of the coupling section according to the predetermined wiring pattern.

7. An assembling apparatus for assembling terminal ends of a cable having at least one first wire and a second wire, the assembly apparatus comprising:

(a) a cable guiding frame which laterally arranges said cable;

(b) a cable clamp means which is adapted to be positioned on said cable guiding frame for holding said cable and said cable guiding frame as a unit;

(c) a wire guiding block adapted to be positioned adjacent to said cable guiding frame for receiving the first wire and the second wire extending from said cable;

(d) a coupling section adapted to be positioned adjacent to said cable guiding frame for providing electrical connection to an external electrical device;

(e) a ground section connected electrically in said coupling section; and (f) bonding means adapted to be positioned adjacent to said wire guiding block for electrically connecting said second wire to said ground section and said first wire to said coupling section.

8. An assembling apparatus as claimed in claim 7, wherein said bonding means disposed adjacent to said wire guiding block is provided with at least one through space for receiving a plurality of said first wires.

9. An assembling apparatus as claimed in claim 7, wherein said wire guiding block comprises:

(a) a cable frame which receives said cable having said first wire and said second wire as a unit;

(b) a first block for receiving a plurality of said first wires separated from a plurality of said second wires of said cables;

(c) a second block for receiving a plurality of said second wires separated from said first wires of said cables.

* * * * *